US011803269B2

(12) United States Patent
Wang et al.

(10) Patent No.: US 11,803,269 B2
(45) Date of Patent: Oct. 31, 2023

(54) TOUCH CONTROL STRUCTURE AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Yu Wang, Beijing (CN); Erjin Zhao, Beijing (CN); Yi Zhang, Beijing (CN); Ping Wen, Beijing (CN); Wei Wang, Beijing (CN); Yang Zeng, Beijing (CN); Yuanqi Zhang, Beijing (CN); Lingran Wang, Beijing (CN); Jun Yan, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 166 days.

(21) Appl. No.: 17/438,777

(22) PCT Filed: Dec. 4, 2020

(86) PCT No.: PCT/CN2020/133924
§ 371 (c)(1),
(2) Date: Sep. 13, 2021

(87) PCT Pub. No.: WO2022/116159
PCT Pub. Date: Jun. 9, 2022

(65) Prior Publication Data
US 2022/0350455 A1  Nov. 3, 2022

(51) Int. Cl.
*G06F 3/041* (2006.01)
*G06F 3/044* (2006.01)

(52) U.S. Cl.
CPC ........ *G06F 3/04164* (2019.05); *G06F 3/0412* (2013.01); *G06F 3/0445* (2019.05); *G06F 3/0446* (2019.05)

(58) Field of Classification Search
CPC .. G06F 3/04164; G06F 3/0412; G06F 3/0446; G06F 2203/04111
See application file for complete search history.

(56) References Cited

U.S. PATENT DOCUMENTS

2016/0054836 A1  2/2016  Wu et al.
2017/0139252 A1  5/2017  Chen et al.
(Continued)

FOREIGN PATENT DOCUMENTS

CN  108376685 A  8/2018
CN  109491546 A  3/2019
(Continued)

OTHER PUBLICATIONS

International Search Report & Written Opinion dated Sep. 9, 2021, regarding PCT/CN2020/133924.

*Primary Examiner* — Liliana Cerullo
(74) *Attorney, Agent, or Firm* — Intellectual Valley Law, P.C.

(57) ABSTRACT

A touch control structure is provided. The touch control structure includes a plurality of touch electrodes in a touch control area and a plurality of touch signal lines in a peripheral area. A respective one of the plurality of touch signal lines comprises a double-layer structure in a double-layer region and a single-layer structure in a single-layer region. The double-layer region and the single-layer region are in a first sub-area of the peripheral area where the plurality of touch signal lines connect to an integrated circuit. A plurality of adjacent double-layer structures in the double-layer region are respectively connected to a plurality of adjacent single-layer structures in the single-layer region.

(Continued)

At least two of the plurality of adjacent single-layer structures are respectively in a first layer and a second layer. The touch control structure further comprises a touch insulating layer between the first layer and the second layer.

17 Claims, 22 Drawing Sheets

(56) References Cited

U.S. PATENT DOCUMENTS

| | | | |
|---|---|---|---|
| 2018/0323250 A1 | 11/2018 | Jeon | |
| 2018/0373377 A1 | 12/2018 | Ye | |
| 2020/0019294 A1 | 1/2020 | Lee et al. | |
| 2020/0083299 A1* | 3/2020 | Kim | H10K 59/126 |
| 2021/0011581 A1* | 1/2021 | Choi | G06F 3/04164 |
| 2021/0036064 A1* | 2/2021 | Jang | G06F 3/04164 |
| 2021/0357057 A1* | 11/2021 | Kim | G06F 3/0445 |
| 2021/0365167 A1 | 11/2021 | You | |

FOREIGN PATENT DOCUMENTS

| | | | | |
|---|---|---|---|---|
| CN | 110187803 A | | 8/2019 | |
| CN | 110727368 A | | 1/2020 | |
| CN | 107065333 B | * | 4/2020 | G02F 1/1345 |

* cited by examiner

TOUCH CONTROL STRUCTURE AND DISPLAY APPARATUS

CROSS-REFERENCE TO RELATED APPLICATION

This application is a national stage application under 35 U.S.C. § 371 of International Application No. PCT/CN2020/133924, filed Dec. 4, 2020, the contents of which are incorporated by reference in the entirety.

TECHNICAL FIELD

The present invention relates to the field of display technology, more particularly, to a touch control structure and a display apparatus.

BACKGROUND

Various types of touch panels have been developed. Examples of touch panels include one-glass-solution (OGS) touch panels, on-cell touch panels, and in-cell touch panels. The on-cell touch panels provide high touch control accuracy. The on-cell touch panels can be classified into single-layer-on-cell (SLOC) touch panels and multi-layer-on-cell (MLOC) touch panels. In particular, multiple point touch control can be achieved in the MLOC touch panels with superior touch control accuracy and blanking effects.

SUMMARY

In one aspect, the present disclosure provides a touch control structure, comprising a plurality of touch electrodes in a touch control area and a plurality of touch signal lines in a peripheral area; wherein a respective one of the plurality of touch signal lines comprises a double-layer structure in a double-layer region and a single-layer structure in a single-layer region, wherein the double-layer region and the single-layer region are in a first sub-area of the peripheral area where the plurality of touch signal lines connect to an integrated circuit, the first sub-area has a first shortest width along a direction from the touch control area to the first sub-area, the first shortest width is greater than a shortest width of at least one of sub-areas of the peripheral area other than the first sub-area; a plurality of adjacent double-layer structures in the double-layer region are respectively connected to a plurality of adjacent single-layer structures in the single-layer region; at least two of the plurality of adjacent single-layer structures are respectively in a first layer and a second layer; and the touch control structure further comprises a touch insulating layer between the first layer and the second layer.

Optionally, the first shortest width is greater than a shortest width of any one of sub-areas of the peripheral area other than the first sub-area.

Optionally, a respective double-layer structure comprises a first portion in the first layer and a second portion in the second layer; a first adjacent respective single-layer structure in the first layer is connected to a respective first portion of a first adjacent double-layer structure; and a second adjacent respective single-layer structure in the second layer is connected to a respective second portion of a second adjacent double-layer structure.

Optionally, the first portion and the second portion are connected through a connecting via extending through the touch insulating layer.

Optionally, multiple first double-layer structures respectively of multiple touch signal lines of the plurality of touch signal lines are clustered in a first region; multiple first single-layer structures respectively of the multiple touch signal lines of the plurality of touch signal lines are clustered in a second region; the multiple first double-layer structures are substantially parallel to each other, and respectively extend along a first direction; the multiple first single-layer structures are substantially parallel to each other, and respectively extend along a second direction; at least two of the multiple first single-layer structures are respectively in the first layer and the second layer; and the first direction and the second direction are different from each other, and intersecting each other at an angle greater than zero.

Optionally, multiple connecting points respectively connecting the multiple first double-layer structures and the multiple first single-layer structures are arranged along a seventh direction; and the second direction and the seventh direction intersect each other at an angle in a range of 6 degrees to 15 degrees.

Optionally, multiple first single-layer structures respectively of multiple touch signal lines of the plurality of touch signal lines are clustered in a second region; multiple second single-layer structures respectively of the multiple touch signal lines of the plurality of touch signal lines are clustered in a third region; the multiple second single-layer structures are respectively connected to the multiple first single-layer structures; the multiple first single-layer structures are substantially parallel to each other, and respectively extend along a second direction; the multiple second single-layer structures are substantially parallel to each other, and respectively extend along a third direction; at least two of the multiple second single-layer structures are respectively in the first layer and the second layer; and the second direction and the third direction are different from each other, and intersecting each other at an angle greater than zero.

Optionally, the second direction and the third direction intersect each other at an angle in a range of 15 degrees to 25 degrees.

Optionally, multiple connecting points respectively connecting the multiple first single-layer structures and the multiple second single-layer structures are arranged along a fourth direction; and the second direction and the fourth direction intersect each other at an angle in a range of 20 degrees to 40 degrees.

Optionally, multiple second single-layer structures respectively of multiple touch signal lines of the plurality of touch signal lines are clustered in a third region; multiple second double-layer structures respectively of the multiple touch signal lines of the plurality of touch signal lines are clustered in a fourth region; the multiple second single-layer structures are substantially parallel to each other, and respectively extend along a third direction; the multiple second double-layer structures are substantially parallel to each other, and respectively extend along a fifth direction; at least two of the multiple second single-layer structures are respectively in the first layer and the second layer; the multiple second single-layer structures are respectively connected to the multiple second double-layer structures; and multiple second connecting points respectively connecting the multiple second single-layer structures and the multiple second double-layer structures are arranged along a sixth direction.

Optionally, the sixth direction is substantially parallel to the second direction.

Optionally, the touch control structure comprises a via extending through the touch insulating layer at a respective second connecting point, a material in the second layer connected to a material in the first layer through the via.

Optionally, multiple third double-layer structures respectively of multiple touch signal lines of the plurality of touch signal lines are clustered in a fifth region; multiple fourth double-layer structures respectively of the multiple touch signal lines of the plurality of touch signal lines are clustered in a sixth region; multiple third single-layer structures respectively of the multiple touch signal lines of the plurality of touch signal lines are clustered in a seventh region; a respective one of the multiple third single-layer structures is a half loop structure connecting a respective one of the multiple third double-layer structures and a respective one of the multiple fourth double-layer structures; the half loop structure comprises two parallel portions respectively extending along a second direction and a connecting portion connecting the two parallel portions together; at least two of the multiple third single-layer structures are respectively in the first layer and the second layer; the multiple third double-layer structures are substantially parallel to each other, and respectively extend along a first direction; the multiple fourth double-layer structures are substantially parallel to each other, and respectively extend along the first direction; and the first direction and the second direction are different from each other, and intersecting each other at an angle greater than zero.

Optionally, multiple fourth single-layer structures respectively of the multiple touch signal lines of the plurality of touch signal lines are clustered in an eighth region; the multiple fourth single-layer structures are respectively connected to the multiple third double-layer structures; the multiple fourth single-layer structures are substantially parallel to each other, and respectively extend along the second direction; and the multiple fourth single-layer structures are at least a sub-set of multiple first single-layer structures.

Optionally, the plurality of touch electrodes comprise a plurality of first mesh electrodes arranged in a plurality of rows and a plurality of second mesh electrodes arranged in a plurality of columns; and the plurality of first mesh electrodes and the plurality of second mesh electrodes are in the second layer.

Optionally, the touch control structure further comprises a plurality of touch electrode bridges in the first layer; and vias extending through the touch insulating layer; wherein the plurality of touch electrode bridges respectively extend through the vias to respectively connect adjacent second mesh blocks in a respective column of a plurality of column of the plurality of second mesh electrodes.

Optionally, the plurality of touch signal lines comprise a plurality of first touch signal lines respectively connected to the plurality of first mesh electrodes; a plurality of second touch signal lines respectively connected to first terminals of the plurality of second mesh electrodes; and a plurality of third touch signal lines respectively connected to second terminals of the plurality of second mesh electrodes.

Optionally, the touch control structure is limited in a touch control region and absent in a window region at least partially surrounded by the touch control region; wherein a window-crossing row of the plurality of first mesh electrodes comprises a first mesh block and a second mesh block respectively on a first side and a second side of the window region; a first conductive plate directly connected to multiple mesh lines of the first mesh block; a second conductive plate directly connected to multiple mesh lines of the second mesh block; and a first conductive bridge connecting the first conductive plate and the second conductive plate; wherein the first conductive plate, the second conductive plate, and the first conductive bridge are respectively around a first portion, a second portion, and a third portion of a periphery of the window region; the first conductive plate and the second conductive plate are in the second layer; and the first conductive bridge is in the first layer.

Optionally, the respective one of the plurality of touch signal lines has a line width in a range of 2.5 µm to 4.5 µm; orthographic projections of adjacent single-layer structures on a base substrate are spaced apart by a shortest distance in a range of 1.1 µm to 3.1 µm; orthographic projections of adjacent single-layer structures in the first layer on the base substrate are spaced apart by a shortest distance in a range of 4.7 µm to 10.7 µm; and orthographic projections of adjacent single-layer structures in the second layer on the base substrate are spaced apart by a shortest distance in a range of 4.7 µm to 10.7 µm.

Optionally, at least two adjacent single-layer structures respectively in the first layer and the second layer are electrically connected to adjacent rows of touch electrodes.

Optionally, the first shortest width is smaller than a reference first shortest width in a corresponding first sub-area in a reference touch control structure in which touch signal lines have a double-layer structure throughout the peripheral area.

In another aspect, the present disclosure provides a display apparatus, comprising a display panel; the touch control structure described herein or fabricated by a method described herein; and an integrated circuit.

Optionally, the display panel comprises a plurality alight emitting elements; an encapsulating layer on the plurality of light emitting elements, wherein the encapsulating layer comprising a first inorganic encapsulating layer, an organic encapsulating layer on a side of the first inorganic encapsulating layer away from the plurality of light emitting elements, a second inorganic encapsulating layer on a side of the organic encapsulating layer away from the first inorganic encapsulating layer; and a buffer layer on a side of the second inorganic encapsulating layer away from the organic encapsulating layer; wherein the touch insulating layer is on a side of the buffer layer away from the second inorganic encapsulating layer.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a touch control structure and a display apparatus that substantially obviate one or more of the problems due to limitations and disadvantages of the related art. In one aspect, the present disclosure provides a touch control structure. In some embodiments, the touch control structure includes a plurality of touch electrodes in a touch control area and a plurality of touch signal lines in a peripheral area. A respective one of the plurality of touch signal lines includes a double-layer structure in a double-layer region and a single-layer structure in a single-layer region. Optionally, the double-layer region and the single-layer region are in a first sub-area of the peripheral area where the plurality of touch signal lines connect to an integrated circuit, the first sub-area has a first shortest width along a direction from the touch control area to the first sub-area, the first shortest width is greater than a shortest width of at least one of sub-areas of the peripheral area other than the first sub-area. Optionally, a plurality of adjacent double-layer structures in the double-layer region are respectively connected to a plurality of adjacent single-layer structures in the single-layer region. Optionally, at least two of the plurality of adjacent single-layer structures are respectively in a first layer and a second layer. Optionally, the touch control structure further includes a touch insulating layer between the first layer and the second layer.

Figure 1A:
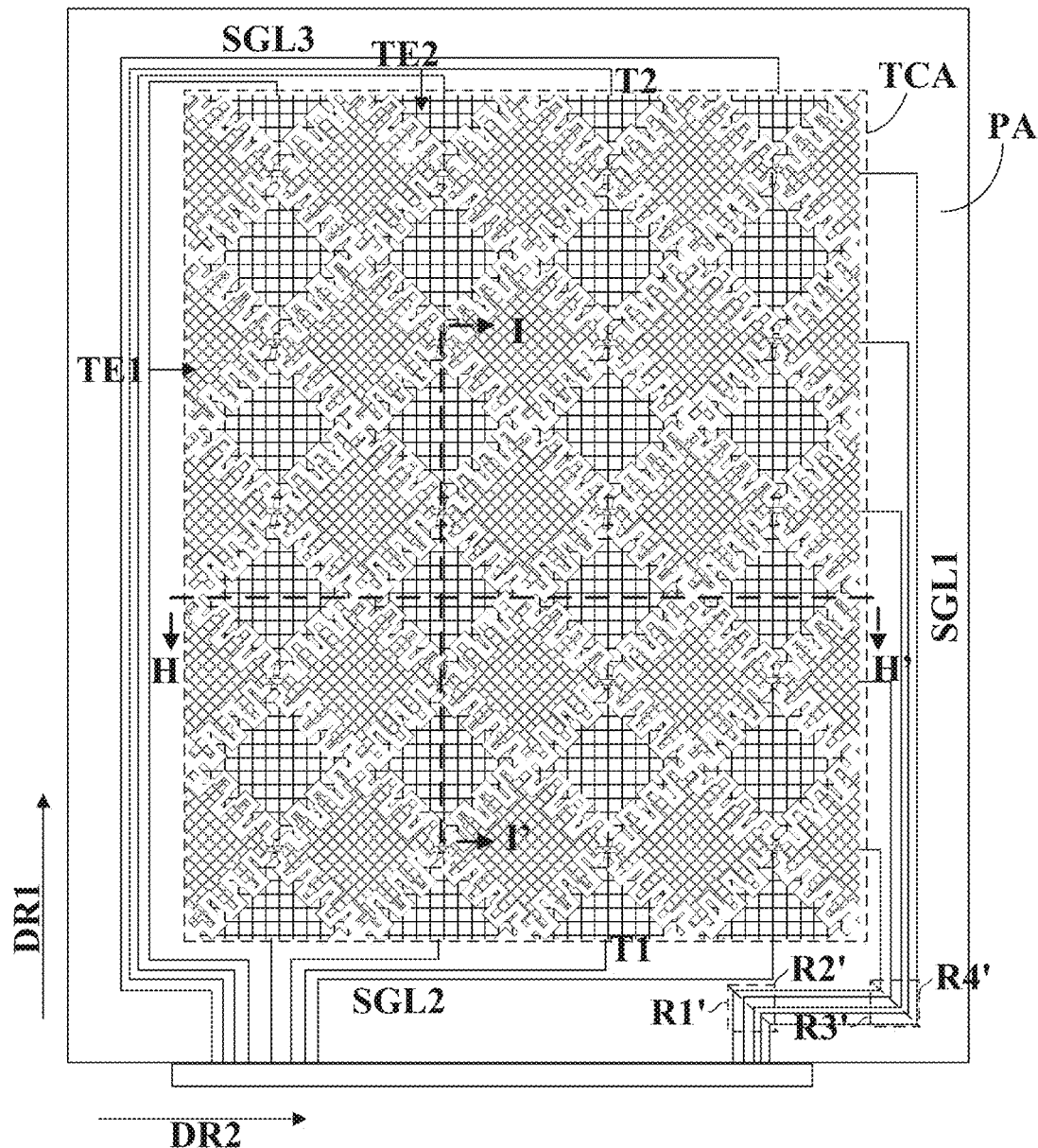
FIG. 1A is a schematic diagram illustrating the structure of a touch control structure in some embodiments according to the present disclosure.

FIG. 1A is a schematic diagram illustrating the structure of a touch control structure in some embodiments according to the present disclosure. Referring to FIG. 1A, the touch control structure in some embodiments includes a plurality of first mesh electrodes TE1 arranged in a plurality of rows and a plurality of second mesh electrodes TE2 arranged in a plurality of columns. Adjacent rows of the plurality of rows are isolated from each other. Adjacent columns of the plurality of columns are isolated from each other. Optionally, the touch control structure is a mutual capacitance type touch control structure. Optionally, the plurality of first mesh electrodes TE1 are a plurality of touch sensing electrodes, and the plurality of second mesh electrodes TE2 are a plurality of touch scanning electrodes. Optionally, the plurality of first mesh electrodes TE1 are a plurality of touch scanning electrodes, and the plurality of second mesh electrodes TE2 are a plurality of touch sensing electrodes.

In some embodiments, the plurality of touch signal lines include a plurality of first touch signal lines SGL1 respectively connected to the plurality of first mesh electrodes TE1 plurality of second touch signal lines SGL2 respectively connected to first terminals T1 of the plurality of second mesh electrodes TE2; and a plurality of third touch signal lines SGL3 respectively connected to second terminals T2 of the plurality of second mesh electrodes TE2. Optionally, a respective one of the plurality of first mesh electrodes TE1 to a respective one of the plurality of first touch signal lines SGL1. Optionally, a respective one of the plurality of second mesh electrodes TE2 is connected to a respective one of the plurality of second touch signal lines SGL2, and connected to a respective one of the plurality of third touch signal lines SGL3.

In some embodiments, the respective one of the plurality of first mesh electrodes TE1 extends along a second direction DR2; and the respective one of the plurality of second mesh electrodes TE2 extends along a first direction DR1. Optionally, the first direction DR1 and the second direction DR2 are two non-parallel directions, for example, the first direction DR1 and the second direction DR2 cross over each other. Optionally, the first direction DR1 and the second direction DR2 are perpendicular to each other. Optionally, the first direction DR1 and the second direction DR2 cross over each other at an inclined angle that is not 90 degrees.

In some embodiments, the plurality of touch electrodes (e.g., the plurality of first mesh electrodes TE1 and the plurality of second mesh electrodes TE2) are in a touch control area TCA, and the plurality of touch signal lines (e.g., the plurality of first touch signal lines SGL1, the plurality of second touch signal lines SGL2, and the plurality of third touch signal lines SGL3) are in a peripheral area PA outside of the touch control area TCA.

Figure 1B:
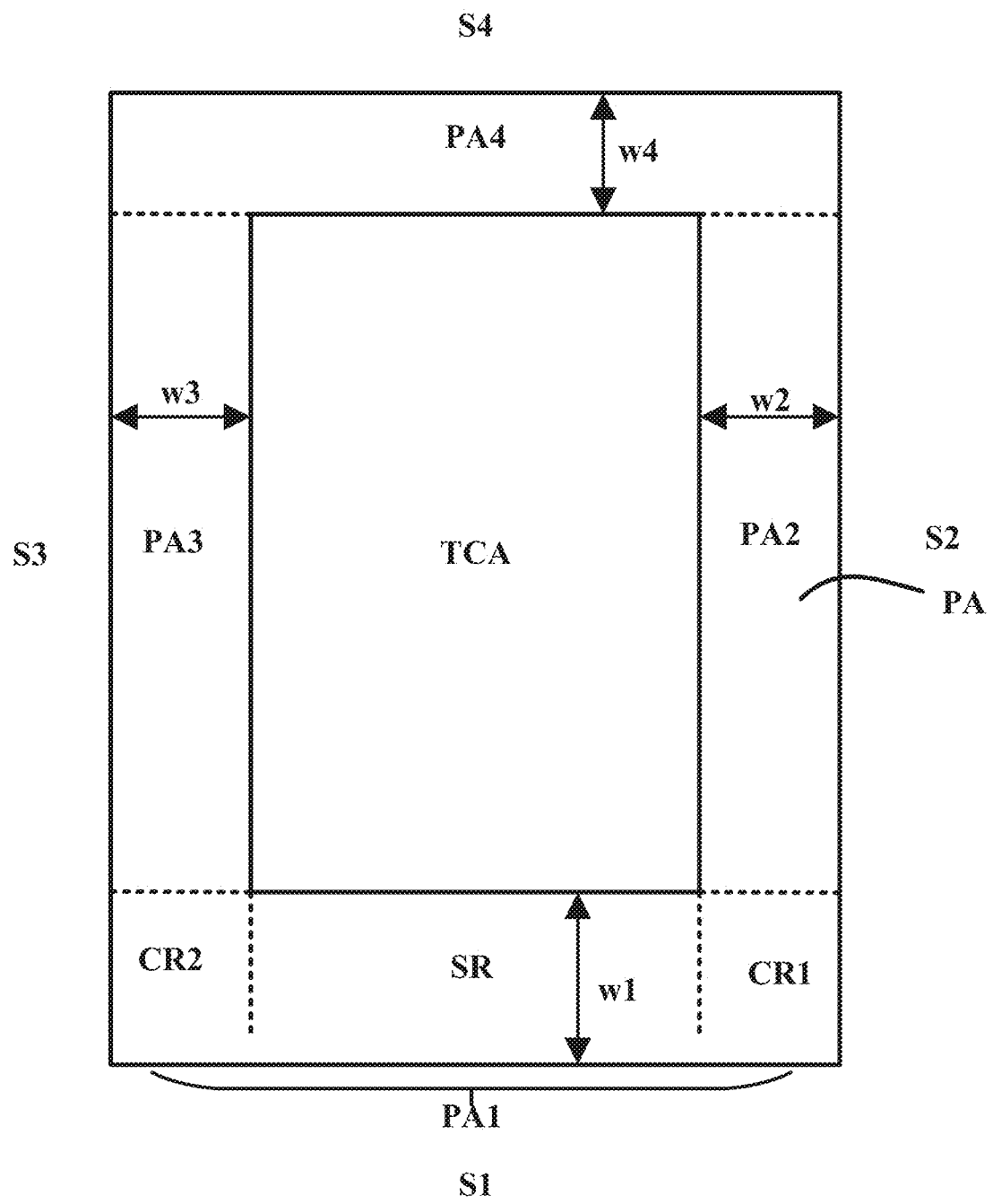
FIG. 1B is a schematic diagram illustrating a touch control area and a peripheral area in a touch control structure in some embodiments according to the present disclosure.

FIG. 1B is a schematic diagram illustrating a touch control area and a peripheral area in a touch control structure in some embodiments according to the present disclosure. Referring to FIG. 1B, in some embodiments, the peripheral area PA includes a first sub-area PA1 on a first side S1 of the touch control area TCA, a second sub-area PA2 on a second side S2 of the touch control area TCA, a third sub-area PA3 on a third side S3 of the touch control area TCA, a fourth sub-area PA4 on a fourth side S4 of the touch control area TCA. Optionally, the first side S1 and the fourth side S4 are opposite to each other. Optionally, the second side S2 and the third side S3 are opposite to each other. Optionally, the first sub-area PA1 is a sub-area where the plurality of first touch signal lines SGL1, the plurality of second touch signal lines SGL2, and the plurality of third touch signal lines SGL3 are connected to an integrated circuit (e.g., an integrated touch control circuit).

In some embodiments, the first sub-area PA1 includes a side region SR and one or more corner regions (e.g., a first corner region CR1 and a second corner region CR2). The one or more corner regions are respectively at a corner of the touch control structure. The one or more corner regions respectively connect the side region SR to one or more adjacent sub-areas of the peripheral area PA. For example, the first corner region CR1 connects the side region SR to the second sub-area PA2, and the second corner region CR2 connects the side region SR to the third sub-area PA3.

In some embodiments, the first sub-area PA1 has a first shortest width w1 along a direction from the touch control area TCA to the first sub-area PA1. Optionally, the second sub-area PA2 has a second shortest width w2 along a direction from the touch control area ICA to the second sub-area PA2. Optionally, the third sub-area PA3 has a third shortest width w3 along a direction from the touch control area TCA to the third sub-area PA3. Optionally, the fourth sub-area PA4 has a fourth shortest width w4 along a direction from the touch control area TCA to the fourth sub-area PA4. In some embodiments, the first shortest width w1 is greater than at least one of the other shortest widths, e.g., greater than at least one of the second shortest width w2, the third shortest width w3, or the fourth shortest width w4. Optionally, the first shortest width w1 is greater than any one of the other shortest widths, e.g., greater than the second shortest width w2, greater than the third shortest width w3, and greater than the fourth shortest width w4.

Figure 2:
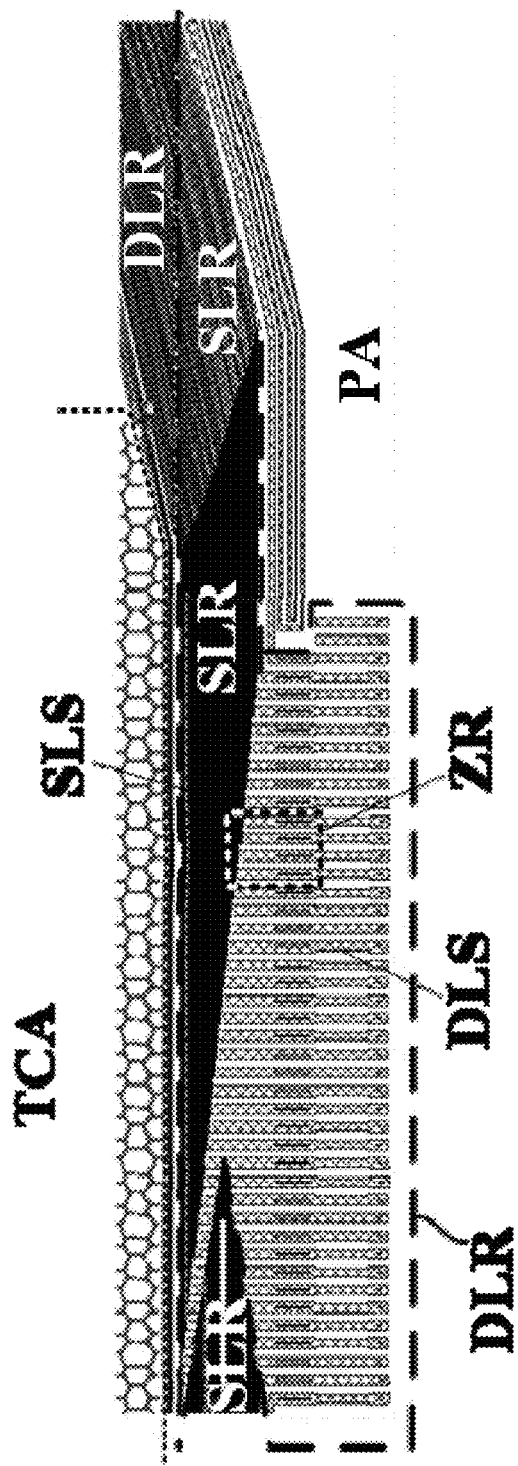
FIG. 2 is a partial zoom-in view of a touch control structure in a region transition from a touch control area to a peripheral area in some embodiments according to the present disclosure.

FIG. 2 is a partial zoom-in view of a touch control structure in a region transition from a touch control area to a peripheral area in some embodiments according to the present disclosure. Referring to FIG. 2, the touch control structure in some embodiments includes a plurality of touch signal lines. A respective one of the plurality of touch signal lines in some embodiments includes a double-layer structure DLS in a double-layer region DLR and a single-layer structure SLS in a single-layer region SLR. The double-layer region DLR and the single-layer region SLR are in the peripheral area of the touch control structure. In some embodiments, the double-layer region DLR and the single-layer region SLR are in the first sub-area PA1.

Figure 3A:
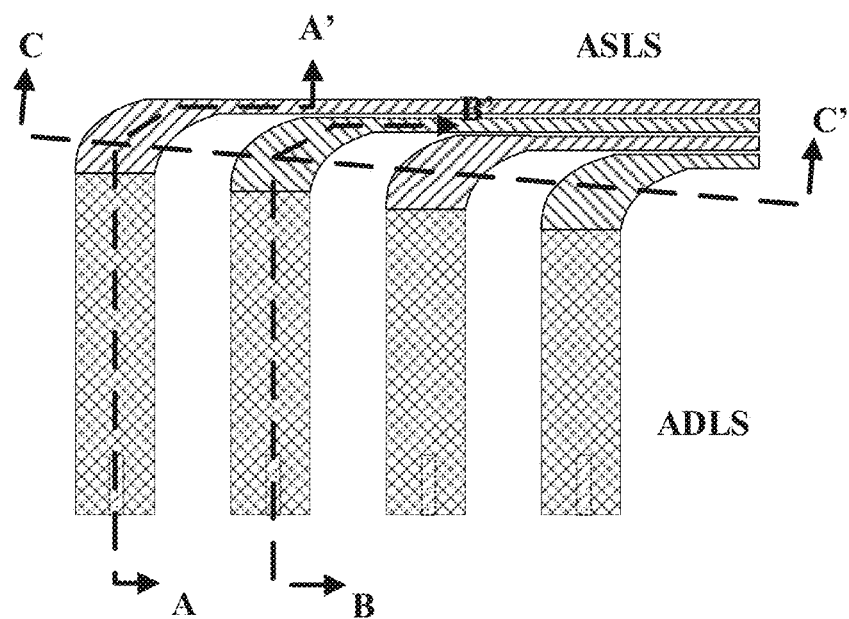
FIG. 3A is a further zoom-in view of a zoom-in region in FIG. 2.
Figure 3B:
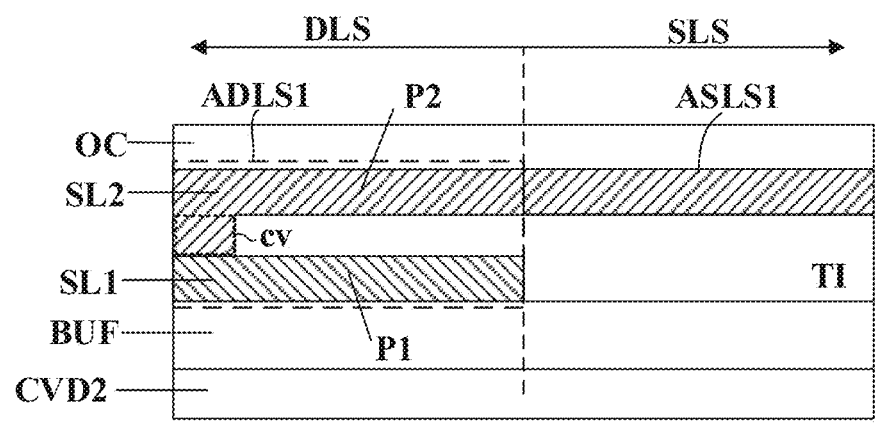
FIG. 3B is a cross-sectional view along an A-A' line in FIG. 3A.
Figure 3C:
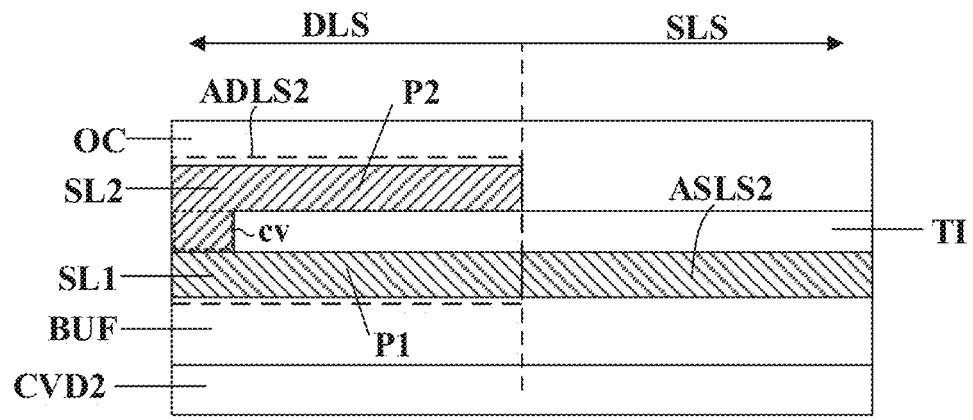
FIG. 3C is a cross-sectional view along a B-B' line in FIG. 3A.
Figure 3D:
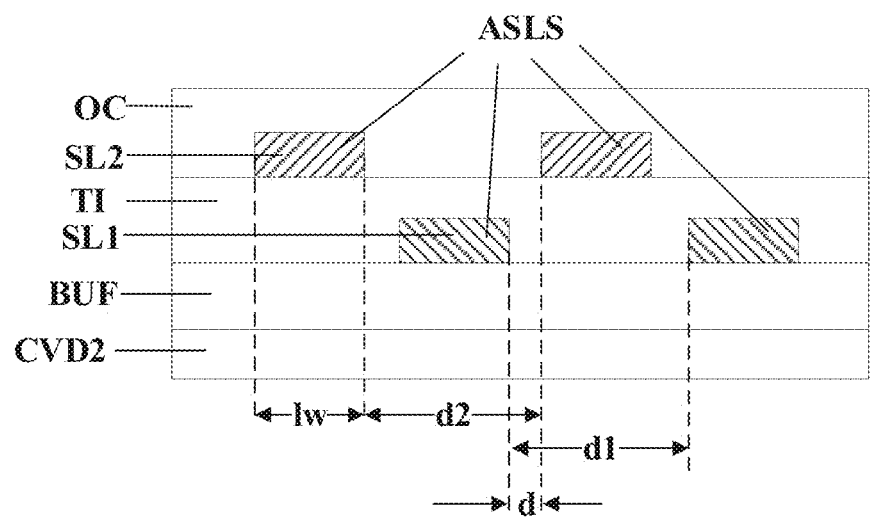
FIG. 3D is a cross-sectional view along a C-C' line in FIG. 3A.

In some embodiments, the touch control structure includes a plurality of adjacent double-layer structures and a plurality of adjacent single-layer structures. In some embodiments, at least two of the plurality of adjacent single-layer structures are respectively in a first layer and a second layer. FIG. 3A is a further zoom-in view of a zoom-in region in FIG. 2. FIG. 3B is a cross-sectional view along an A-A' line in FIG. 3A. FIG. 3C is a cross-sectional view along a B-B' line in FIG. 3A. FIG. 3D is a cross-sectional view along a C-C' line in FIG. 3A. Referring to FIG. 2, FIG. 3A to FIG. 3D, a plurality of adjacent double-layer structures ADLS in the double-layer region DLR are respectively connected to a plurality of adjacent single-layer structures ASLS in the single-layer region SLR. Referring to FIG. 3A to FIG. 3D, in some embodiments, at least two of the plurality of adjacent single-layer structures are respectively in a first layer SL1 and a second layer SL2. In one example depicted in FIG. 3A to FIG. 3D, the plurality of adjacent single-layer structures ASLS are alternately in a first layer SL1 and a second layer SL2. In the context of the present disclosure, the plurality of adjacent single-layer structures ASLS are portions of touch signal lines. For example, referring to FIG. 1A, FIG. 2, FIG. 3A to FIG. 3D, at least two adjacent single-layer structures respectively in the first layer SL1 and the second layer SL2 are electrically connected to adjacent rows of touch electrodes.

In one example as shown in FIG. 3A to FIG. 3C, the touch control structure includes a buffer layer BUF on a second inorganic encapsulating sub-layer CVD2, the second inorganic encapsulating sub-layer CVD2 being a sub-layer of an encapsulating layer for encapsulating light emitting elements in a display apparatus having the touch control structure. In some embodiments, the touch control structure further includes a first layer SL1 on a side of the buffer layer BUF away from the second inorganic encapsulating sub-layer CVD2, a touch insulating layer T1 on a side of the first layer SL1 away from the buffer layer BUF, a second layer SL2 on a side of the touch insulating layer T1 away from the first layer SL1, and an overcoat layer OC on a side of the second layer SL2 away from the touch insulating layer T1.

In some embodiments, a respective double-layer structure includes a first portion P1 in the first layer SL1 and a second portion P2 in the second layer SL2, as depicted in FIG. 3A to FIG. 3C. As shown in FIG. 3B, a first adjacent respective single-layer structure ASLS1 in the second layer SL2 is connected to a respective second portion P2 of a first adjacent double-layer structure ADLS1. A second adjacent respective single-layer structure ASLS2 in the first layer SL1 is connected to a respective first portion P1 of a second adjacent double-layer structure ADLS2. Optionally, the first adjacent respective single-layer structure ASLS1 in the second layer SL2 is continuously connected to the respective second portion P2 of a first adjacent double-layer structure ADLS1, forming a unitary structure. Optionally, the second adjacent respective single-layer structure ASLS2 in the first layer SL1 is continuously connected to the respective first portion P1 of a second adjacent double-layer structure ADLS2, forming a unitary structure.

Referring to FIG. 2 and FIG. 3D, in some embodiments, at least two of the plurality of adjacent single-layer structures ASLS are respectively in a first layer SL1 and a second layer SL2. In one example depicted in FIG. 2 and FIG. 3D, the plurality of adjacent single-layer structures ASLS are alternately in a first layer SL1 and a second layer SL2. The inventors of the present disclosure discover that by having this structure, a pitch of the plurality of touch signal lines can be significantly decreased, a display apparatus having the present touch structure can be made to have a much narrower peripheral area. In one example, a width of a peripheral area from a display area to an edge of the display panel can be reduced from 1.36 mm to 1.076 mm. In another example, a distance between the display area and a signal line more distant to the display area can be reduced from 0.435 mm to 0.331 mm. Moreover, the signal lines in a same layer, for example, single-layer structures in the first layer SL1 can be further spaced apart from each other, avoiding short. By having the single-layer structures in a same layer spaced apart further, it also reduces the complication involved in making a mask plate for patterning of the plurality of signal lines, and makes the etching process less prone to defects.

For example, the first sub-area of the peripheral area having the double-layer region and the single-layer region discussed above has a first shortest width along a direction from the touch control area to the first sub-area. The first shortest width can be reduced from 1.36 mm to 1.076 mm. The reference value 1.36 mm may be a reference first shortest width of a corresponding first sub-area of the peripheral area in a reference touch control structure that does not have the double-layer region and the single-layer region of the present disclosure. In one example, touch signal lines of the reference touch control structure adopt a double-layer structure throughout the peripheral area. By forming the touch signal lines to have an intricate structure as discussed in the present disclosure, the first shortest width in the first sub-area can be reduced as compared to that in the reference touch control structure.

For example, normally a minimum pitch of 7.5 μm is required to avoid defects such as short and etching defects. By having the plurality of adjacent single-layer structures ASLS alternately disposed in the first layer SL1 and the second layer SL2, a minimum pitch can be significantly reduced to 5.6 μm or less. Further, signal lines in a same layer can be spaced apart, for example, from 7.5 μm to 11.2 μm or more.

In some embodiments, the respective one of the plurality of touch signal lines has a line width in a range of 2.5 μm to 4.5 μm, e.g., 2.5 μm to 3.0 μm, 3.0 μm to 3.5 μm, 3.5 μm to 4.0 μm, or 4.0 μm to 4.5 μm. Optionally, the respective one of the plurality of touch signal lines has a line width of 3.5 μm. In some embodiments, the plurality of adjacent single-layer structures ASLS has a line width (denoted as 1w in FIG. 3D) in a range of 2.5 μm to 4.5 μm, e.g., 2.5 μm to 3.0 μm, 3.0 μm to 3.5 μm, 3.5 μm to 4.0 μm, or 4.0 μm to 4.5 μm. Optionally, the plurality of adjacent single-layer structures ASLS has a line width of 3.5 μm. In some embodiments, the plurality of adjacent double-layer structures ADLS has a line width in a range of 2.5 μm to 4.5 μm, e.g., 2.5 μm to 3.0 μm, 3.0 μm to 3.5 μm, 3.5 μm to 4.0 μm, or 4.0 μm to 4.5 μm. Optionally, the plurality of adjacent double-layer structures ADLS has a line width of 3.5 μm.

Referring to FIG. 3D, in some embodiments, orthographic projections of adjacent single-layer structures on a base substrate are spaced apart by a shortest distance d in a range of 1.1 μm to 3.1 μm, e.g., 1.1 μm to 1.6 μm, 1.6 μm to 2.1 μm, or 2.6 μm to 3.1 μm. Optionally, the orthographic projections of adjacent single-layer structures on a base substrate are spaced apart by a shortest distance of 2.1 μm. In some embodiments, orthographic projections of adjacent single-layer structures in the first layer SL1 on the base substrate are spaced apart by a shortest distance d1 in a range of 4.7 μm to 10.7 μm, e.g., 4.7 μm to 5.7 μm, 5.7 μm to 6.7 μm, 6.7 μm to 7.7 μm, 7.7 μm to 8.7 μm, 8.7 μm to 9.7 μm, or 9.7 μm to 10.7 μm. Optionally, the orthographic projections of adjacent single-layer structures in the first layer SL1 on the base substrate are spaced apart by a shortest distance of 7.7 μm. In some embodiments, orthographic projections of adjacent single-layer structures in the second layer SL2 on the base substrate are spaced apart by a shortest distance d2 in a range of 4.7 μm to 10.7 μm, e.g., 4.7 μm to 5.7 μm, 5.7 μm to 6.7 μm, 6.7 μm to 7.7 μm, 7.7 μm to 8.7 μm, 8.7 μm to 9.7 μm, or 9.7 μm to 10.7 μm. Optionally, the orthographic projections of adjacent single-layer structures in the second layer SL2 on the base substrate are spaced apart by a shortest distance of 7.7 μm.

Referring to FIG. 3D, Optionally, orthographic projections of adjacent single-layer structures in the first layer SL1 and the second layer SL2 are non-overlapping with each other.

Figure 3E:
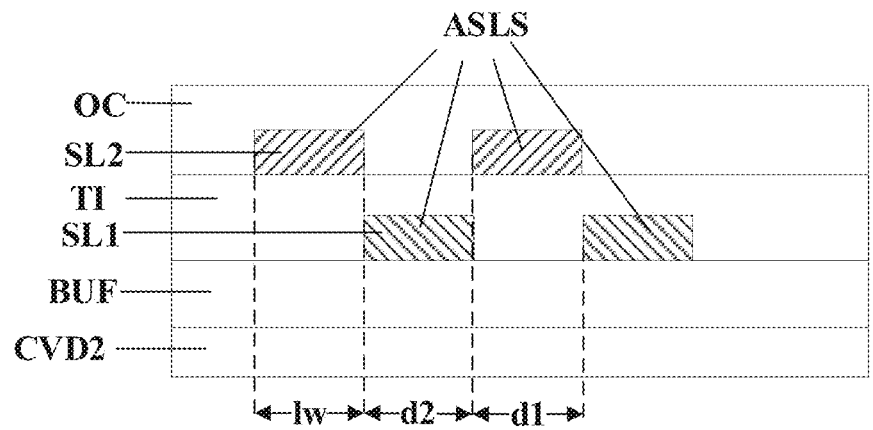
FIG. 3E is a cross-sectional view of a plurality of adjacent single-layer structures ASLS in the single-layer region in some embodiments according to the present disclosure.

FIG. 3E is a cross-sectional view of a plurality of adjacent single-layer structures ASLS in the single-layer region in some embodiments according to the present disclosure. Referring to FIG. 3E, in some embodiments, orthographic projections of adjacent single-layer structures of the plurality of adjacent single-layer structures ASLS on a base substrate directly abutting each other.

Figure 3F:
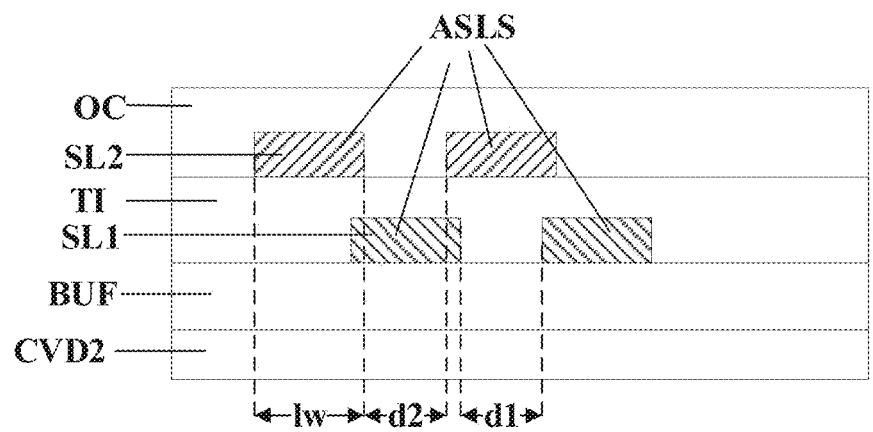
FIG. 3F is a cross-sectional view of a plurality of adjacent single-layer structures ASLS in the single-layer region in some embodiments according to the present disclosure.

FIG. 3F is a cross-sectional view of a plurality of adjacent single-layer structures ASLS in the single-layer region in some embodiments according to the present disclosure. Referring to FIG. 3F, in some embodiments, orthographic projections of adjacent single-layer structures of the plurality of adjacent single-layer structures ASLS on a base substrate at least partially overlapping with each other.

Referring to FIG. 3A to FIG. 3C, in some embodiments, the first portion P1 and the second portion P2 of a respective double-layer structure are connected through a connecting via CV extending through the touch insulating layer T1.

In some embodiments, orthographic projections of adjacent double-layer structures on a base substrate are spaced apart by a shortest distance d in a range of 3.0 μm to 5.0 μm, e.g., 3.0 μm to 3.5 μm, 3.5 μm to 4.0 μm, 4.0 μm to 4.5 μm, or 4.5 μm to 5.0 μm. Optionally, the orthographic projections of adjacent double-layer structures on a base substrate are spaced apart by a shortest distance of 4.0 μm.

Figure 4:
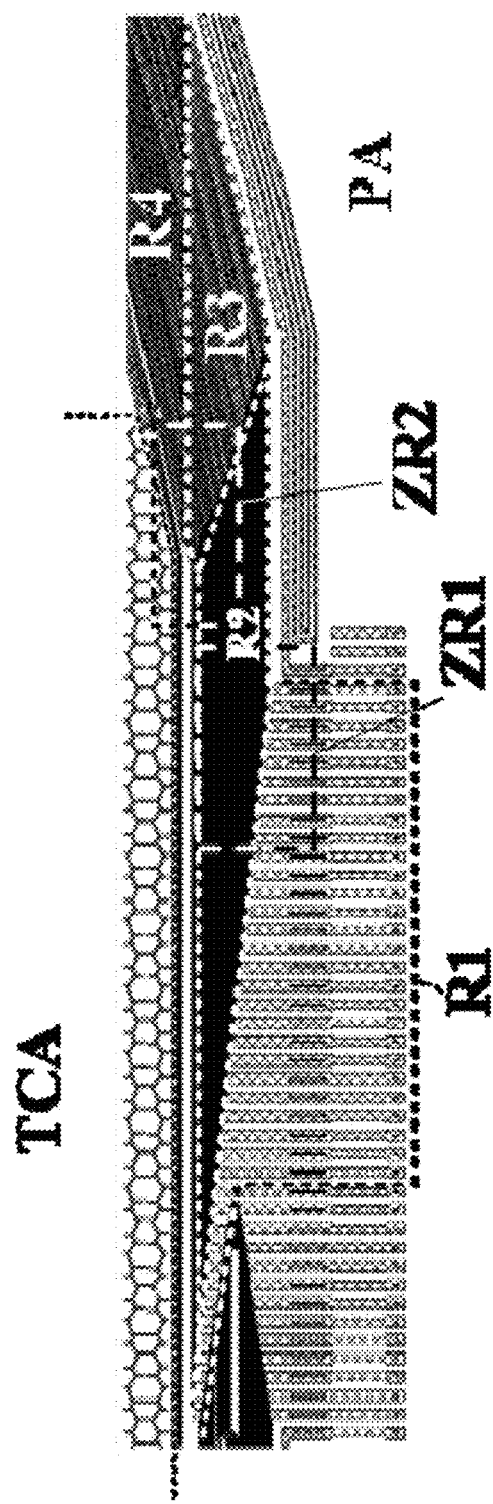
FIG. 4 is a partial zoom-in view of a touch control structure in a region transition from a touch control area to a peripheral area in some embodiments according to the present disclosure.
Figure 5:
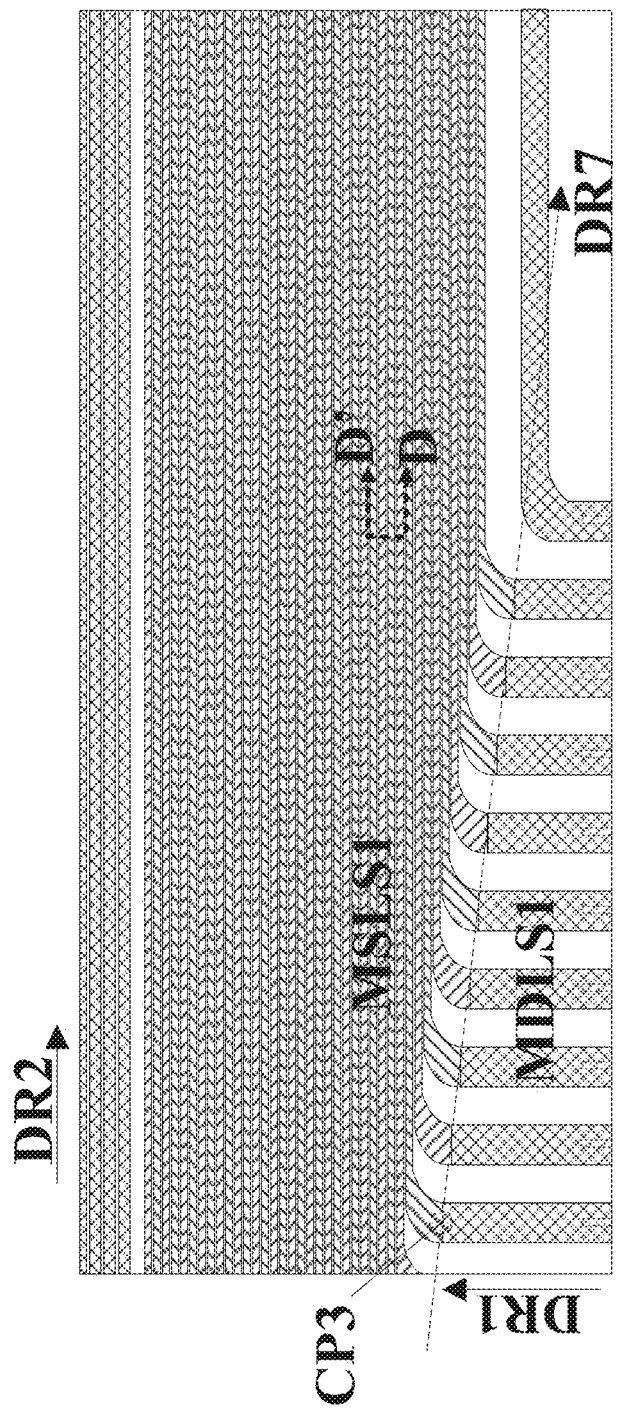
FIG. 5 is a further zoom-in view of a first zoom-in region in FIG. 4.

FIG. 4 is a partial zoom-in view of a touch control structure in a region transition from a touch control area to a peripheral area in some embodiments according to the present disclosure. FIG. 5 is a further zoom-in view of a first zoom-in region in FIG. 4. Referring to FIG. 4 and FIG. 5, in some embodiments, multiple first double-layer structures MDLS1 respectively of multiple touch signal lines of the plurality of touch signal lines are clustered in a first region R1; and multiple first single-layer structures MSLS1 respectively of the multiple touch signal lines of the plurality of touch signal lines are clustered in a second region R2. The multiple first double-layer structures MDLS1 are respectively connected to the multiple first single-layer structures MSLS1 (as similarly discussed in connection with FIG. 2, FIG. 3A to FIG. 3B). The first region R1 and the second region R2 are directly adjacent to each other.

In some embodiments, the multiple first double-layer structures MDLS1 and the multiple first single-layer structures MSLS1 are portions of touch signal lines of a same type. In one example, the multiple first double-layer structures MDLS1 and the multiple first single-layer structures MSLS1 are portions of touch scanning signal lines connected to touch scanning electrodes. In another example, the multiple first double-layer structures MDLS1 and the multiple first single-layer structures MSLS1 are portions of touch sensing signal lines connected to touch sensing electrodes. In one example, the multiple first double-layer structures MDLS1 and the multiple first single-layer structures MSLS1 are portions of the plurality of first touch signal lines SGL1. The regions corresponding to the first region R1 and the second region R2 are denoted as R1' and R2' in FIG. 1A.

In some embodiments, multiple connecting points CP3 respectively connecting the multiple first double-layer structures MDLS1 and the multiple first single-layer structures MSLS1 are arranged along a seventh direction DR7. Optionally, the second direction DR2 and the seventh direction DR7 are two non-parallel directions, for example, the second direction DR2 and the seventh direction DR7 cross over each other. Optionally, the second direction DR2 and the seventh direction DR7 cross over each other at an inclined angle that is not 90 degrees. In some embodiments, the second direction DR2 and the seventh direction DR7 intersect each other at an angle in a range of 6 degrees to 15 degrees, e.g., 6 degrees to 7 degrees, 7 degrees to 8 degrees, 8 degrees to 9 degrees, 9 degrees to 10 degrees, 10 degrees to 11 degrees, 11 degrees to 12 degrees, 12 degrees to 13 degrees, 13 degrees to 14 degrees or 14 degrees to 15 degrees. Optionally, the second direction DR2 and the seventh direction DR7 intersect each other at an angle of 10.5 degrees.

Figure 6:
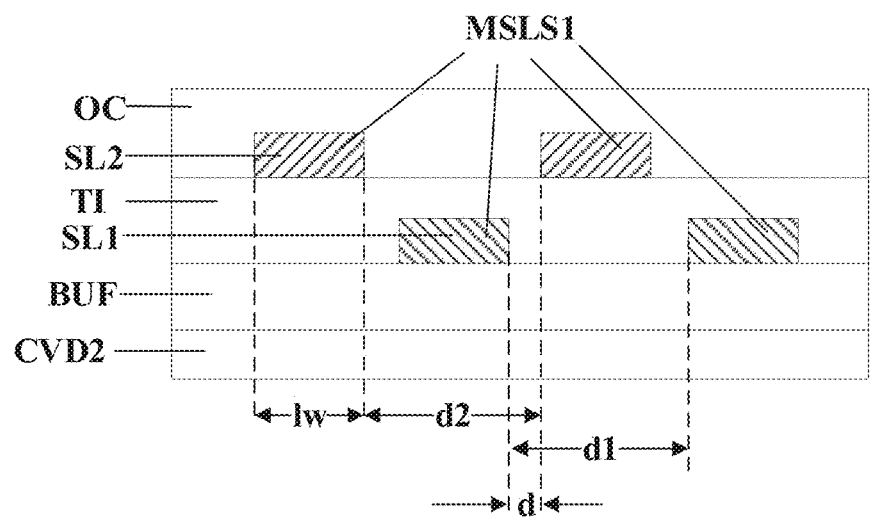
FIG. 6 is a cross-sectional view along a D-D' line in FIG. 5.

FIG. 6 is a cross-sectional view along a D-D' line in FIG. 5. Referring to FIG. 6, and as similarly discussed above in connection with FIG. 3A to FIG. 3D, in some embodiments, in the second region R2, at least two of the multiple first single-layer structures MSLS1 are respectively in the first layer SL1 and the second layer SL2. In one example as depicted in FIG. 6, FIG. 3A to FIG. 3D, in the second region R2, the multiple first single-layer structures MSLS1 are alternately in the first layer SL1 and the second layer SL2.

In some embodiments, the multiple first double-layer structures MDLS1 are substantially parallel to each other, and respectively extend along a first direction DR1; and the multiple first single-layer structures MSLS1 are substantially parallel to each other, and respectively extend along a second direction DR2. The first direction DR1 and the second direction DR2 are different from each other, and intersecting each other at an angle greater than zero. Optionally, the first direction DR1 and the second direction DR2 are two non-parallel directions, for example, the first direction DR1 and the second direction DR2 cross over each other. Optionally, the first direction DR1 and the second direction DR2 are perpendicular to each other. Optionally, the first direction DR1 and the second direction DR2 cross over each other at an inclined angle that is not 90 degrees.

Figure 8:
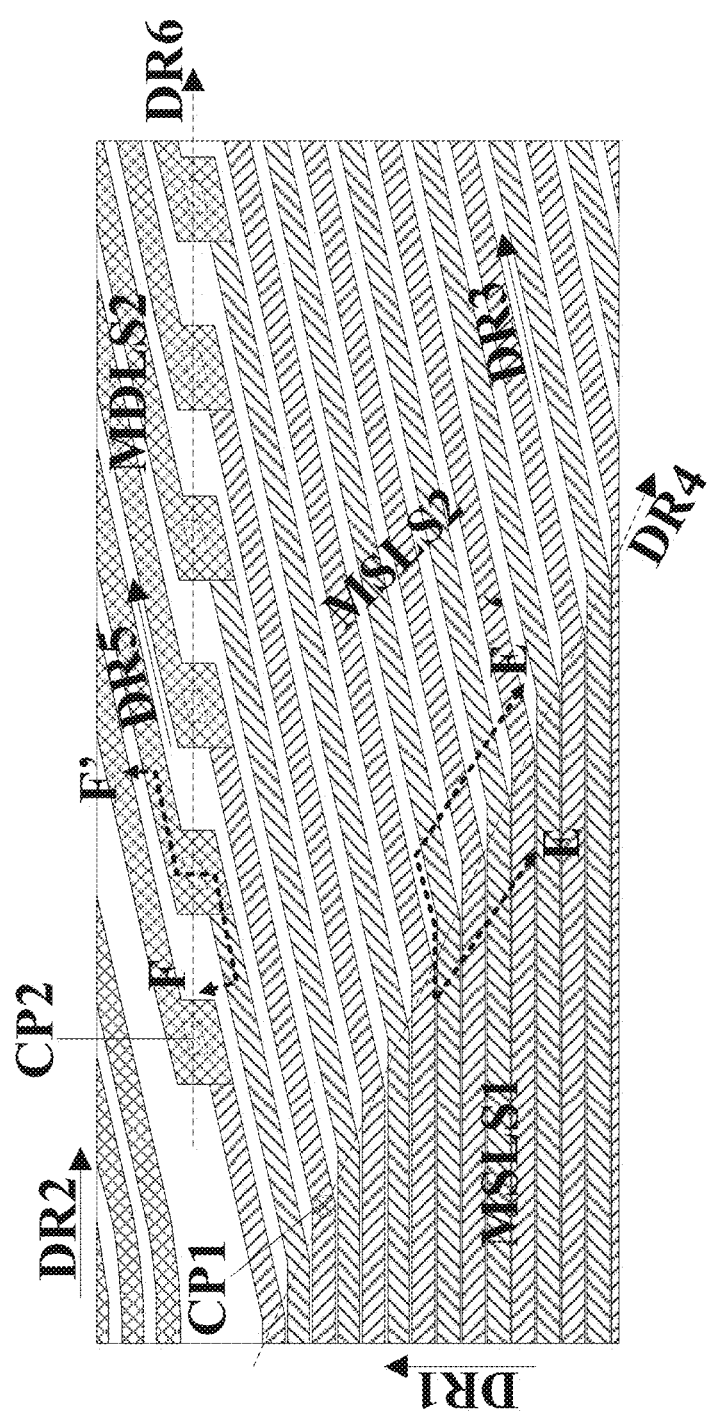
FIG. 8 is a further zoom-in view of a third zoom-in region in FIG. 7.

FIG. 8 is a further zoom-in view of a second zoom-in region in FIG. 4. Referring to FIG. 4 and FIG. 8, in some embodiments, multiple first single-layer structures MSLS1 respectively of the multiple touch signal lines of the plurality of touch signal lines are clustered in a second region R2; and multiple second single-layer structures MSLS2 respectively of the multiple touch signal lines of the plurality of touch signal lines are clustered in a third region R3. The multiple first single-layer structures MSLS1 are respectively connected to the multiple second single-layer structures MSLS2. The second region R2 and the third region R3 are directly adjacent to each other.

In some embodiments, the multiple first single-layer structures MSLS1 and the multiple second single-layer structures MSLS2 are portions of touch signal lines of a same type. In one example, the multiple first single-layer structures MSLS1 and the multiple second single-layer structures MSLS2 are portions of touch scanning signal lines connected to touch scanning electrodes. In another example, the multiple first single-layer structures MSLS1 and the multiple second single-layer structures MSLS2 are portions of touch sensing signal lines connected to touch sensing electrodes. In one example, the multiple first single-layer structures MSLS1 and the multiple second single-layer structures MSLS2 are portions of the plurality of first touch signal lines SGL1 in one example, the multiple first single-layer structures MSLS1 and the multiple second single-layer structures MSLS2 are portions of the plurality of second touch signal lines SGL2. In one example, the multiple first single-layer structures MSLS1 and the multiple second single-layer structures MSLS2 are portions of the plurality of third touch signal lines SGL3.

In some embodiments, the multiple first single-layer structures MSLS1 are substantially parallel to each other, and respectively extend along a second direction DR2; and the multiple second single-layer structures MSLS2 are substantially parallel to each other, and respectively extend along a third direction DR3. Optionally, the second direction DR2 and the third direction DR3 are two non-parallel directions, for example, the second direction DR2 and the third direction DR3 cross over each other. Optionally, the second direction DR2 and the third direction DR3 cross over each other at an inclined angle that is not 90 degrees. In some embodiments, the second direction DR2 and the third direction DR3 intersect each other at an angle in a range of 15 degrees to 25 degrees, e.g., 15 degrees to 17 degrees, 17 degrees to 19 degrees, 19 degrees to 21 degrees, 21 degrees to 23 degrees, or 23 degrees to 25 degrees. Optionally, the second direction DR2 and the third direction DR3 intersect each other at an angle of 20.03 degrees.

Figure 9:
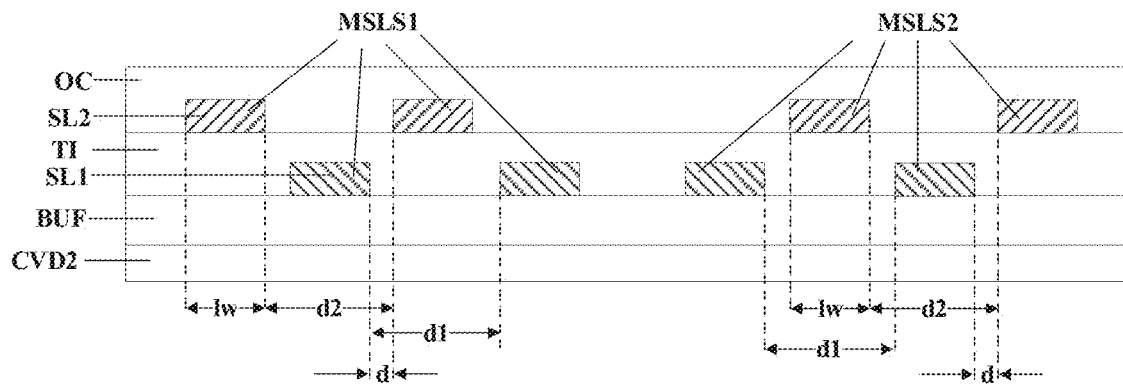
FIG. 9 is a cross-sectional view along an E-E' line in FIG. 8.

FIG. 9 is a cross-sectional view along an E-E' line in FIG. 8. Referring to FIG. 9, in some embodiments, in the second region R2, at least two of the multiple first single-layer structures MSLS1 are respectively in the first layer SL1 and the second layer SL2. In one example as depicted in FIG. 9 and FIG. 8, in the second region R2, the multiple first single-layer structures MSLS1 are alternately in the first layer SL1 and the second layer SL2. In some embodiments, in the third region R3, at least two of the multiple second single-layer structures MSLS2 are respectively in the first layer SL1 and the second layer SL2. In one example as depicted in FIG. 9 and FIG. 8, in the third region R3, the multiple second single-layer structures MSLS2 are alternately in the first layer SL1 and the second layer SL2.

In some embodiments, multiple connecting points CP1 respectively connecting the multiple first single-layer structures MSLS1 and the multiple second single-layer structures MSLS2 are arranged along a fourth direction DR4. Optionally, the second direction DR2 and the fourth direction DR4 are two non-parallel directions, for example, the second direction DR2 and the fourth direction DR4 cross over each other. Optionally, the second direction DR2 and the fourth direction DR4 cross over each other at an inclined angle that is not 90 degrees. In some embodiments, the second direction DR2 and the fourth direction DR4 intersect each other at an angle in a range of 20 degrees to 40 degrees, e.g., 20 degrees to 25 degrees, 25 degrees to 30 degrees, 30 degrees to 35 degrees, or 35 degrees to 40 degrees. Optionally, the second direction DR2 and the fourth direction DR4 intersect each other at an angle of 30.848 degrees.

Figure 7:
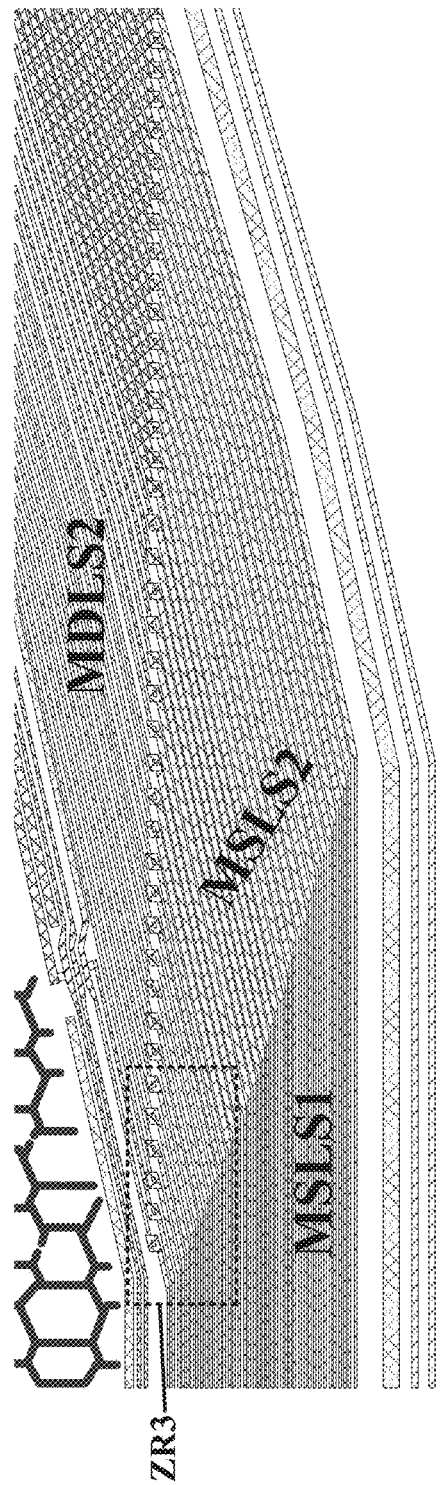
FIG. 7 is a further zoom-in view of a second zoom-in region in FIG. 4.

In some embodiments, referring to FIG. 4, FIG. 7, and FIG. 8, multiple second single-layer structures MSLS2 respectively of the multiple touch signal lines of the plurality of touch signal lines are clustered in a third region and multiple second double-layer structures MDLS2 respectively of the multiple touch signal lines of the plurality of touch signal lines are clustered in a fourth region R4. The multiple second single-layer structures MSLS2 are respectively connected to the multiple second double-layer structures MDLS2. The third region R3 and the fourth region R4 are directly adjacent to each other. Optionally, the third region R3 and the fourth region R4 are in a corner region of the touch control structure. For example, the regions corresponding to the third region R3 and the fourth region R4 are denoted as R3' and R4' in FIG. 1A.

In some embodiments, the multiple second single-layer structures MSLS2 and the multiple second double-layer structures MDLS2 are portions of touch signal lines of a same type. In one example, the multiple second single-layer structures MSLS2 and the multiple second double-layer structures MDLS2 are portions of touch scanning signal lines connected to touch scanning electrodes. In another example, the multiple second single-layer structures MSLS2 and the multiple second double-layer structures MDLS2 are portions of touch sensing signal lines connected to touch sensing electrodes. In one example, the multiple second single-layer structures MSLS2 and the multiple second double-layer structures MDLS2 are portions of the plurality of first touch signal lines SGL1. In one example, the multiple second single-layer structures MSLS2 and the multiple second double-layer structures MDLS2 are portions of the plurality of second touch signal lines SGL2. In one example, the multiple second single-layer structures MSLS2 and the multiple second double-layer structures MDLS2 are portions of the plurality of third touch signal lines SGL3.

In some embodiments, the multiple second single-layer structures MSLS2 are substantially parallel to each other, and respectively extend along a third direction DR3; and the multiple second double-layer structures MDLS2 are substantially parallel to each other, and respectively extend along a fifth direction DR5.

In some embodiments, the third direction DR3 and the fifth direction DR5 are substantially parallel to each other, e.g., within an error of less than 5 degrees, or perfectly parallel to each other.

In some embodiments, the third direction DR3 and the fifth direction DR5 are two non-parallel directions, for example, the third direction DR3 and the fifth direction DR5 cross over each other. Optionally, the third direction DR3 and the fifth direction DR5 cross over each other at an inclined angle that is not 90 degrees. In some embodiments, the third direction DR3 and the fifth direction DR5 intersect each other at an angle less than 10 degrees.

Referring to FIG. 9, in some embodiments, in the third region R3, the multiple second single-layer structures MSLS2 are alternately in the first layer SL1 and the second layer SL2.

In some embodiments, multiple second connecting points CP2 respectively connecting the multiple second single-layer structures MSLS2 and the multiple second double-layer structures MDLS2 are arranged along a sixth direction DR6.

In some embodiments, the second direction DR2 and the sixth direction DR5 are substantially parallel to each other, e.g., within an error of less than 5 degrees, or perfectly parallel to each other.

In some embodiments, the second direction DR2 and the sixth direction DR6 are two non-parallel directions, for example, the second direction DR2 and the sixth direction DR6 cross over each other. Optionally, the second direction DR2 and the sixth direction DR6 cross over each other at an inclined angle that is not 90 degrees. In some embodiments, the second direction DR2 and the sixth direction DR6 intersect each other at an angle less than 10 degrees.

Figure 10:
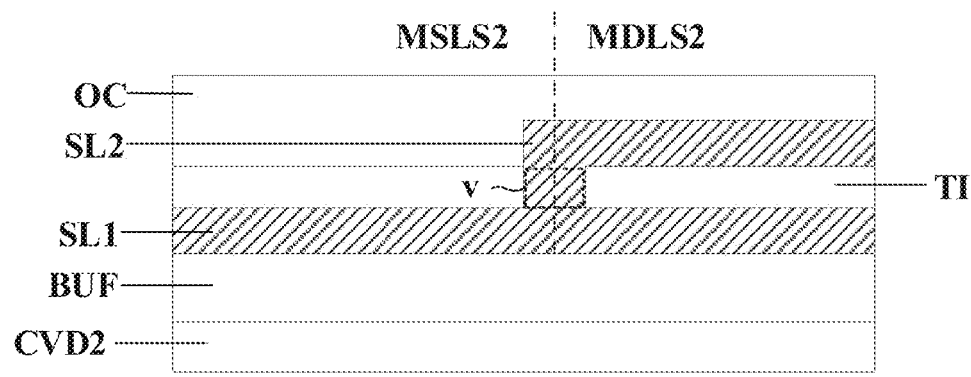
FIG. 10 is a cross-sectional view alone an F-F' line in FIG. 8.

FIG. 10 is a cross-sectional view along an F-F' line in FIG. 8. Referring to FIG. 8 and FIG. 10, the touch control structure in some embodiments includes a via v extending through the touch insulating layer T1 at a respective second connecting point CP2, a material in the second layer SL2 connected to a material in the first layer SL1 through the via v.

Figure 11:
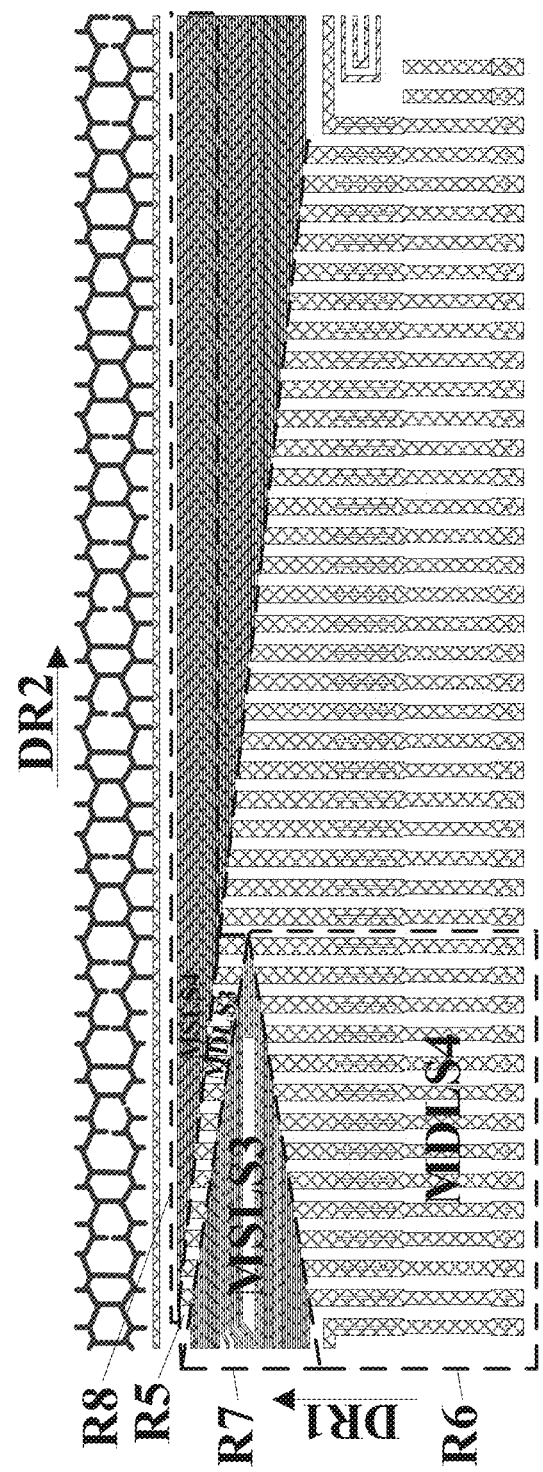
FIG. 11 is a partial zoom-in view of a touch control structure in a region transition from a touch control area to a peripheral area in some embodiments according to the present disclosure.
Figure 12:
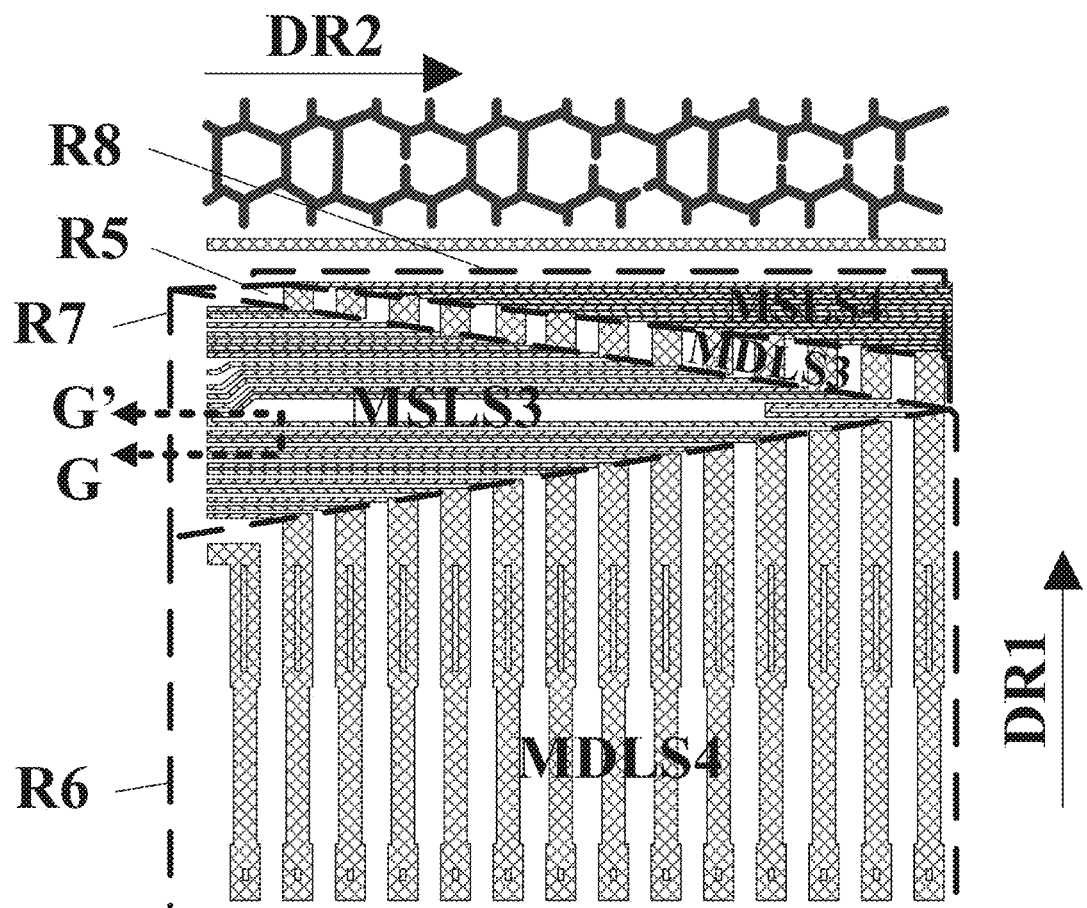
FIG. 12 is a further zoom-in view of FIG. 11.

FIG. 11 is a partial zoom-in view of a touch control structure in a region transition from a touch control area to a peripheral area in some embodiments according to the present disclosure. FIG. 12 is a further zoom-in view of FIG. 11. Referring to FIG. 11 and FIG. 12, multiple third double-layer structures MDLS3 respectively of multiple touch signal lines of the plurality of touch signal lines are clustered in a fifth region R5; multiple fourth double-layer structures MDLS4 respectively of the multiple touch signal lines of the plurality of touch signal lines are clustered in a sixth region R6; multiple third single-layer structures MSLS3 respectively of the multiple touch signal lines of the plurality of touch signal lines are clustered in a seventh region R7. The multiple fourth double-layer structures MDLS4 in the sixth regions R6 are respectively connected to the multiple third single-layer structures MSLS3 in the seventh region R7. The multiple third single-layer structures MSLS3 in the seventh region R7 are respectively connected to the multiple third double-layer structures MDLS3 in the fifth region R5. The sixth regions R6 is directly adjacent to the seventh region R7. The seventh region R7 is directly adjacent to the fifth region R5.

In some embodiments, the multiple third double-layer structures MDLS3, the multiple fourth double-layer structures MDLS4, and the multiple third single-layer structures MSLS3 are portions of touch signal lines of a same type. In one example, the multiple third double-layer structures MDLS3, the multiple fourth double-layer structures MDLS4, and the multiple third single-layer structures MSLS3 are portions of touch scanning signal lines connected to touch scanning electrodes. In another example, the multiple third double-layer structures MDLS3, the multiple fourth double-layer structures MDLS4, and the multiple third single-layer structures MSLS3 are portions of touch sensing signal lines connected to touch sensing electrodes. In one example, the multiple third double-layer structures MDLS3, the multiple fourth double-layer structures MDLS4, and the multiple third single-layer structures MSLS3 are portions of the plurality of first touch signal lines SGL1. In one example, the multiple third double-layer structures MDLS3, the multiple fourth double-layer structures MDLS4, and the multiple third single-layer structures MSLS3 are portions of the plurality of second touch signal lines SGL2. In one example, the multiple third double-layer structures MDLS3, the multiple fourth double-layer structures MDLS4, and the multiple third single-layer structures MSLS3 are portions of the plurality of third touch signal lines SGL3.

Figure 13:
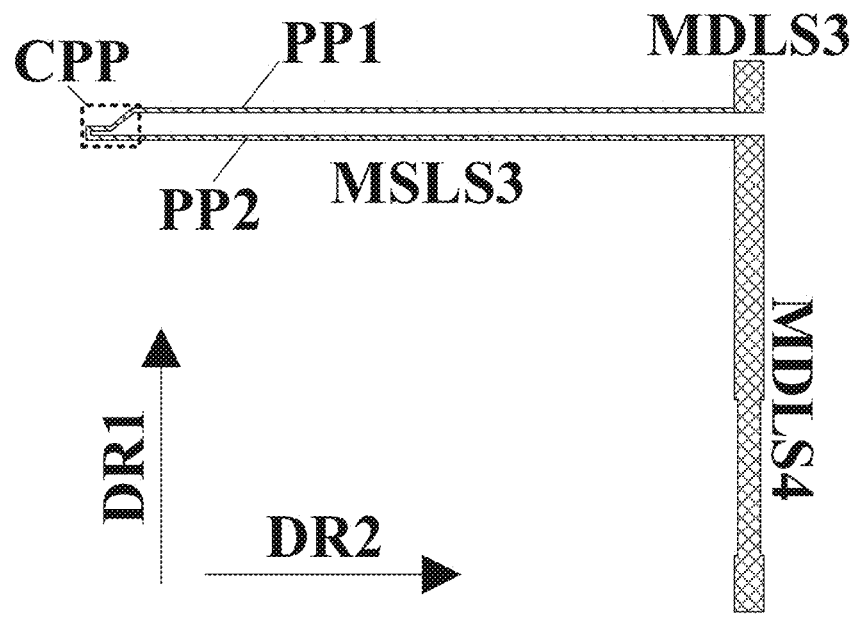
FIG. 13 illustrates a respective one of multiple third single-layer structures connecting a respective one of multiple third double-layer structures and a respective one of multiple fourth double-layer structures.

FIG. 13 illustrates a respective one of multiple third single-layer structures connecting a respective one of multiple third double-layer structures and a respective one of multiple fourth double-layer structures. Referring to FIG. 13, a respective one of the multiple third single-layer structures MSLS3 is a half loop structure connecting a respective one of the multiple third double-layer structures MDLS3 and a respective one of the multiple fourth double-layer structures MDLS4. The half loop structure includes two parallel portions PP1 and PP2 respectively extending along a second direction DR2 and a connecting portion CPP connecting the two parallel portions PP1 and PP2 together.

In some embodiments, the multiple third double-layer structures MDLS3 are substantially parallel to each other, and respectively extend along a first direction DR1; and the multiple fourth double-layer structures MDLS4 are substantially parallel to each other, and respectively extend along the first direction DR1. The first direction DR1 and the second direction DR2 are different from each other, and intersecting each other at an angle greater than zero. Optionally, the first direction DR1 and the second direction DR2 are two non-parallel directions, for example, the first direction DR1 and the second direction DR2 cross over each other. Optionally, the first direction DR1 and the second direction DR2 are perpendicular to each other. Optionally, the first direction DR1 and the second direction DR2 cross over each other at an inclined angle that is not 90 degrees.

Figure 14:
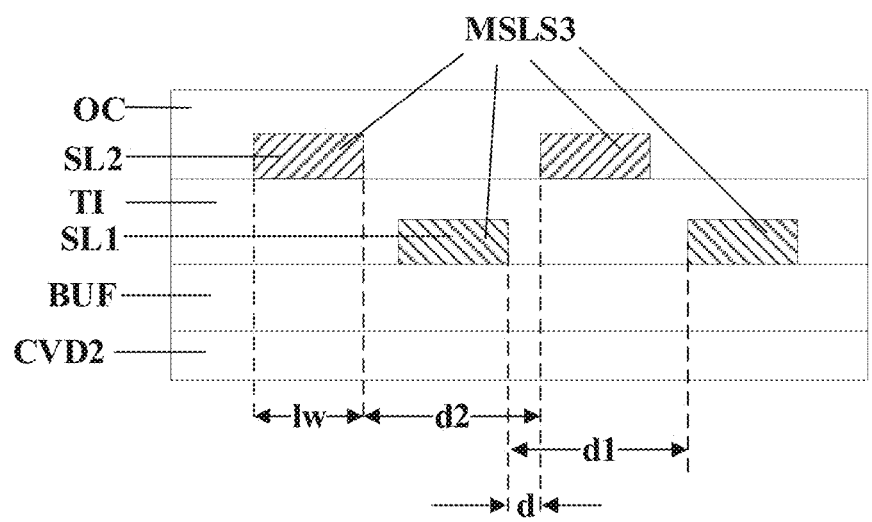
FIG. 14 is a cross-sectional view along a G-G' line in FIG. 12.

FIG. 14 is a cross-sectional view along a G-G' line in FIG. 12. Referring to FIG. 12 and FIG. 14, in some embodiments, in the seventh region R7, at least two of the multiple third single-layer structures MSLS3 are respectively in the first layer SL1 and the second layer SL2. In one example as depicted in FIG. 14 and FIG. 12, in the seventh region R7, the multiple third single-layer structures MSLS3 are alternately in the first layer SL1 and the second layer SL2.

Referring to FIG. 11 and FIG. 12, in some embodiments, multiple fourth single-layer structures MSLS4 respectively of the multiple touch signal lines of the plurality of touch signal lines are clustered in an eighth region R8. The multiple fourth single-layer structures MSLS4 are substantially parallel to each other, and respectively extend along the second direction DR2. The multiple fourth single-layer structures MSLS4 are respectively connected to the multiple third double-layer structures MDLS3. As shown in FIG. 4, FIG. 5, FIG. 11, and FIG. 12, the multiple fourth single-layer structures MSLS4 are at least a sub-set of multiple first single-layer structures MSLS1.

Figure 15:
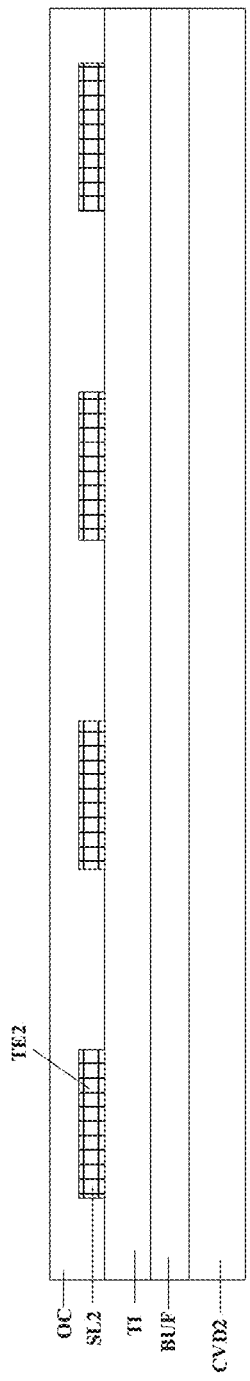
FIG. 15 is a cross-sectional view alone an H-H' line in FIG. 1A.
Figure 16:
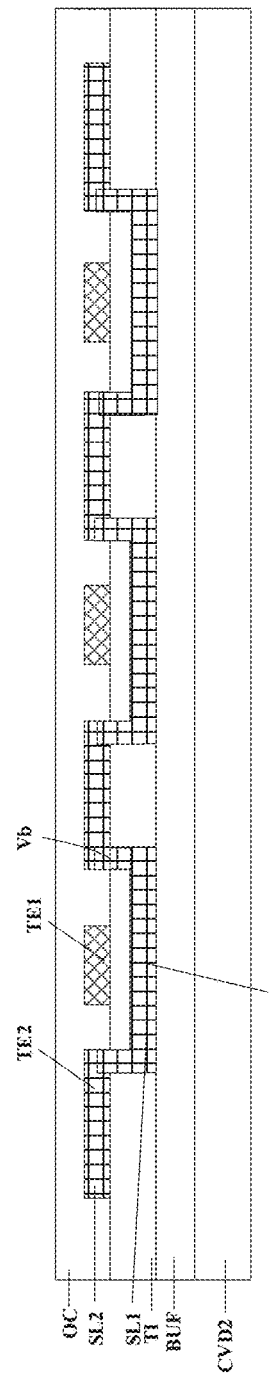
FIG. 16 is a cross-sectional view along an I-I' line in FIG. 1A.

FIG. 15 is a cross-sectional view along an H-H' line in FIG. 1A. FIG. 16 is a cross-sectional view along an I-I' line in FIG. 1A. As shown in FIG. 1A, FIG. 15, and FIG. 16, in some embodiments, the touch control structure includes a plurality of first mesh electrodes TE1 arranged in a plurality of rows and a plurality of second mesh electrodes TE2 arranged in a plurality of columns. The plurality of first mesh electrodes TE1 and the plurality of second mesh electrodes TE2 are in the second layer SL2. The touch control structure further includes a plurality of touch electrode bridges EB in the first layer SL1; and vias Vb extending through the touch insulating layer T1. Optionally, the plurality of touch electrode bridges EB respectively extend through the vias Vb to respectively connect adjacent second mesh blocks in a respective column of the plurality of column of the plurality of second mesh electrodes TE2.

Figure 17:
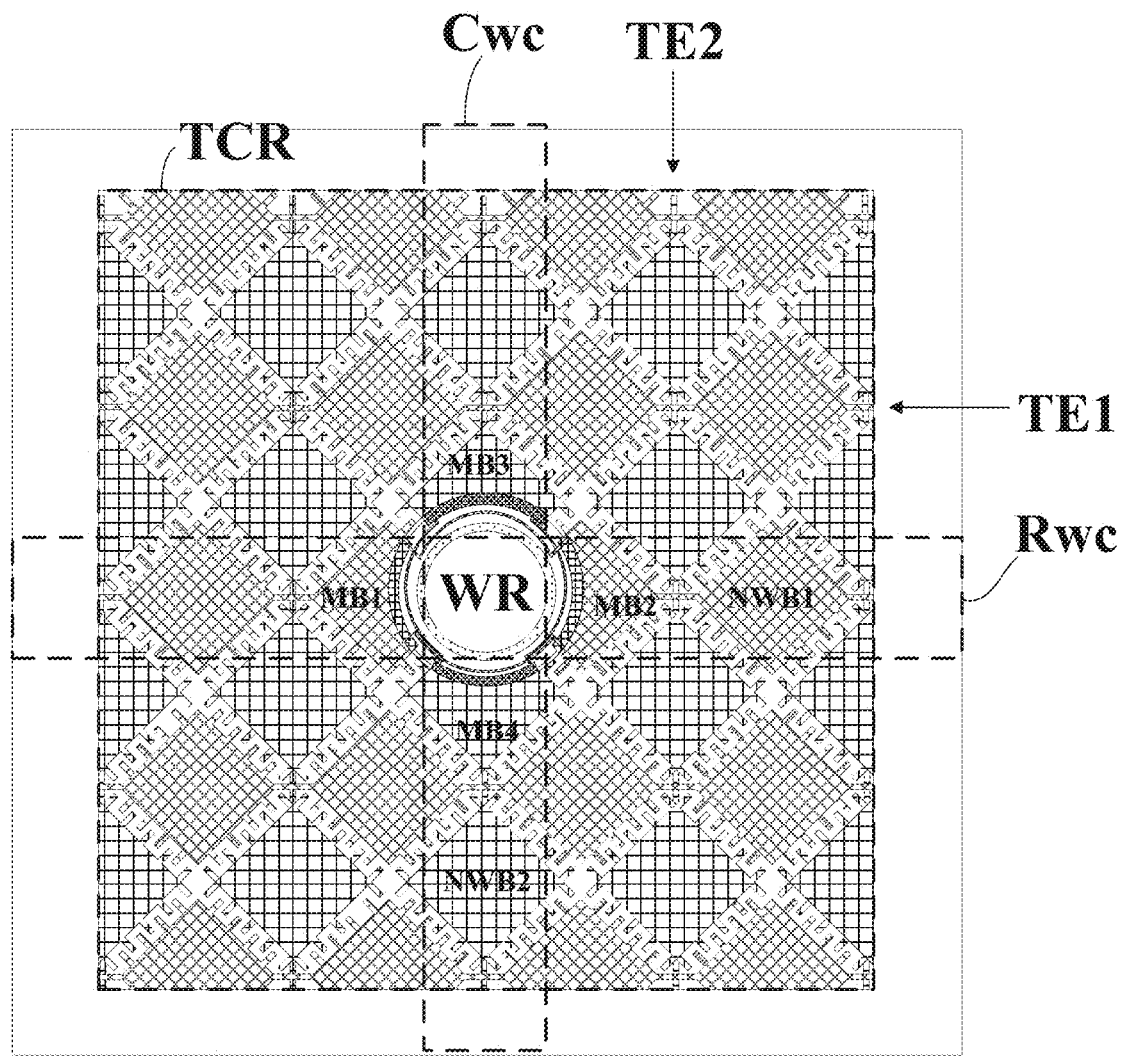
FIG. 17 is a schematic diagram illustrating a touch control structure in some embodiments according to the present disclosure.

FIG. 17 is a schematic diagram illustrating a touch control structure in some embodiments according to the present disclosure. Referring to FIG. 17, the touch control structure in some embodiments includes a plurality of first mesh electrodes TE1 and a plurality of second mesh electrodes TE2. Optionally, the touch control structure is a mutual capacitance type touch control structure. Optionally, the plurality of first mesh electrodes TE1 are a plurality of touch scanning electrodes, and the plurality of second mesh electrodes TE2 are a plurality of touch sensing electrodes. Optionally, the plurality of mesh touch electrodes TE1 are a plurality of touch sensing electrodes, and the plurality of second mesh electrodes TE2 are a plurality of touch scanning electrodes. The touch control structure is limited in a touch control region TCR and absent in a window region WR surrounded by the touch control region TCR. For example, the touch control structure may be a touch control structure in a display panel, where the touch control region TCR substantially overlaps with a display region of the display panel, and the window region WR is a region in the display panel having a hole configured for installing an accessory such as a camera lens or a fingerprint sensor. The display panel is configured to display an image in at least a portion of the touch control region TCR. In one example, in the window region WR, display elements of the display panel and the touch control structure are absent; in the display region or at least a portion of the touch control region TCR, both display elements of the display panel and the touch control structure are present.

Referring to FIG. 17, in some embodiments, the plurality of mesh touch electrodes TE1 are arranged in a plurality of rows, each of which is a respective one of the plurality of mesh touch electrodes TE1; the plurality of meshscanning electrodes TE2 are arranged in a plurality of columns, each of which is a respective one of the plurality of second mesh electrodes TE2. In some embodiments, at least one row of the plurality of rows of first mesh electrodes TE1 over the window region WR. For example, as shown in FIG. 17, a window-crossing row Rwc of the plurality of first mesh electrodes TE1 crosses over the window region WR. The touch electrode in the window-crossing row Rwc is spaced apart by the window region WR into two portions (a portion on left side of the window region WR and a portion on right side of the window region WR). In some embodiments, at least one column of the plurality of columns of second mesh electrodes TE2 crosses over the window region WR. For example, as shown in FIG. 17, a window-crossing column Cwc of the plurality of second mesh electrodes TE2 crosses over the window region WR. The touch electrode in the window-crossing column Cwc is spaced apart by the window region WR into two portions (a portion on upper side of the window region WR and a portion on lower side of the window region WR).

Figure 18A:
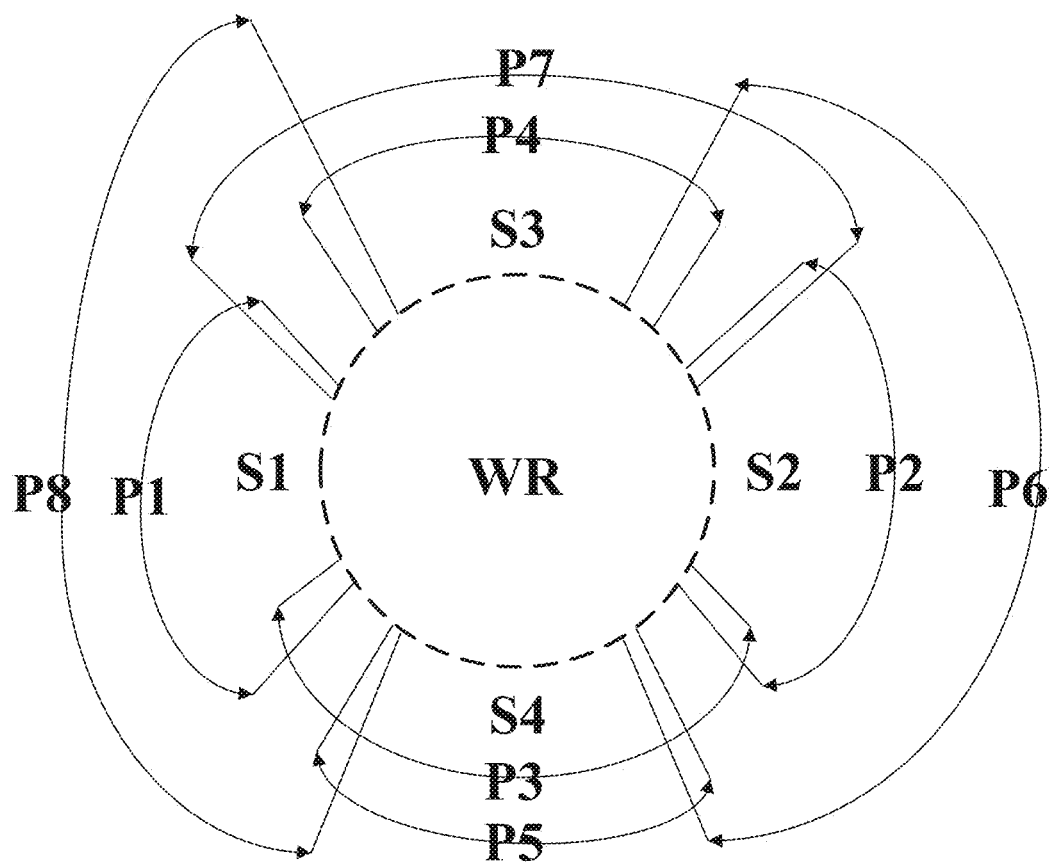
FIG. 18A is a schematic diagram illustrating a window region in some embodiments according to the present disclosure.
Figure 18B:
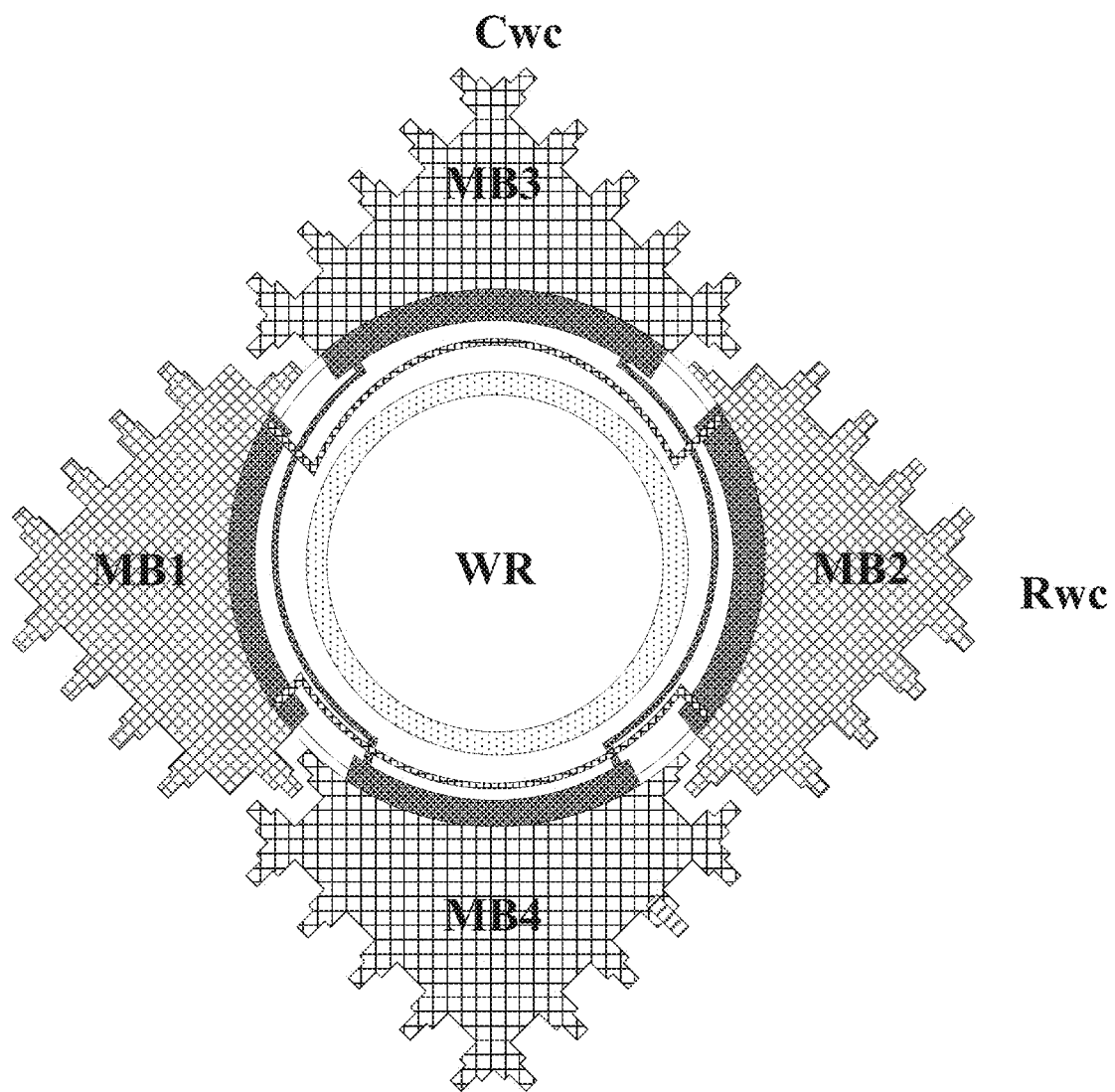
FIG. 18B is a zoom-in view of a touch control structure surrounding a window region in some embodiments according to the present disclosure.
Figure 18C:
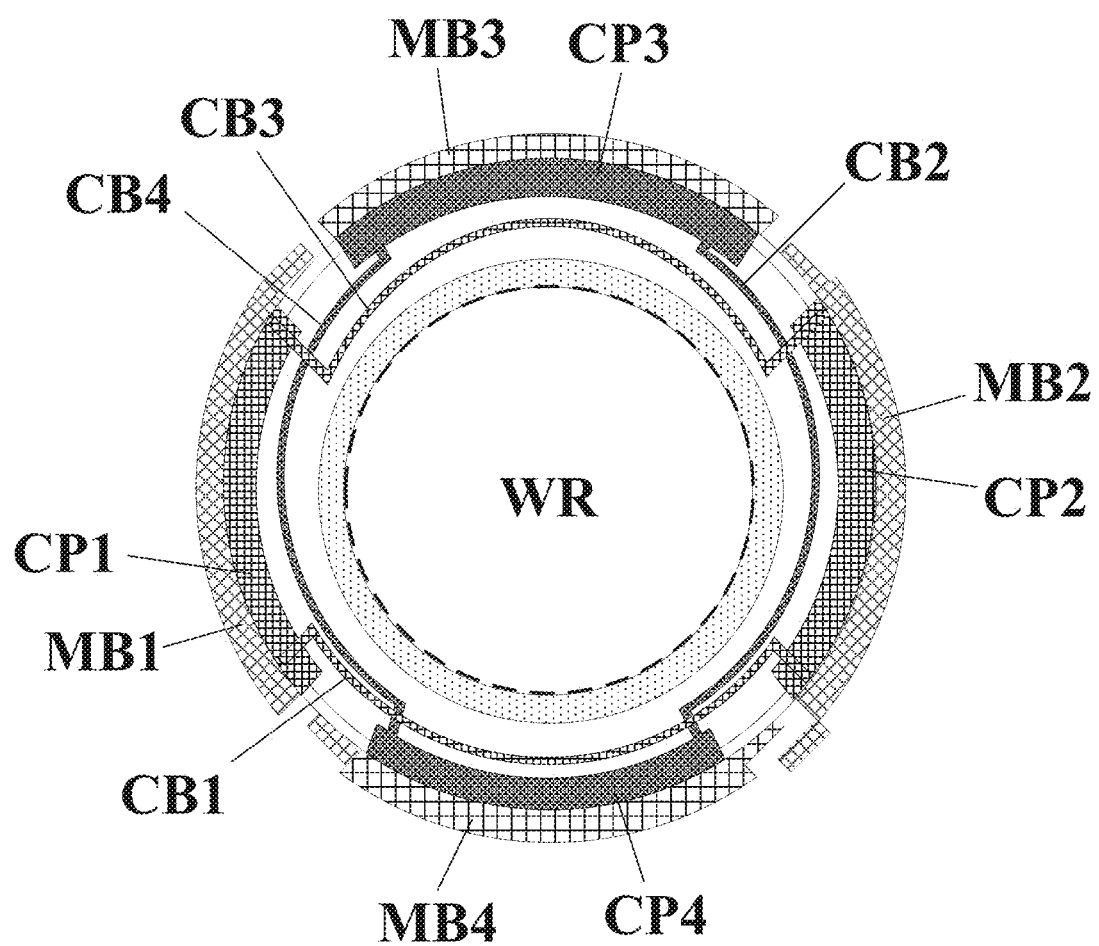
FIG. 18C is a further zoom-in view of a touch control structure surrounding a window region in some embodiments according to the present disclosure.

FIG. 18A is a schematic diagram illustrating a window region in some embodiments according to the present disclosure. FIG. 18B is a zoom-in view of a touch control structure surrounding a window region in some embodiments according to the present disclosure. FIG. 18C is a further zoom-in view of a touch control structure surrounding a window region in some embodiments according to the present disclosure. Referring to FIG. 18A, in some embodiments, the window region WR has at least four sides, including a first side S1, a second side S2, a third side S3, and a fourth side S4. Referring to FIG. 18A to FIG. 18C, in some embodiments, the window-crossing row Rwc of the plurality of first mesh electrodes TE1 includes a first mesh block MB1 and a second mesh block MB2 respectively on a first side S1 and a second side S2 of the window region WR; a first conductive plate CP1 directly connected to multiple mesh lines of the first mesh block MB1; a second conductive plate CP2 directly connected to multiple mesh lines of the second mesh block MB2; and a first conductive bridge CB1 connecting the first conductive plate CP1 and the second conductive plate CP2.

In the present touch control structure, the adjacent mesh blocks (e.g., the first mesh block MB1 and the second mesh block MB2) separated by the window region WR are connected by a conductive connecting bridge (e.g., the first conductive bridge CB1) through the aid of conductive plates (e.g., the first conductive plate CP1 and the second conductive plate CP2). Because forming the connecting bridge typically involves forming vias to connect corresponding mesh electrodes, it is extremely difficult to precisely connect mesh electrode lines with the connecting bridge without a conductive plate as an intermediate. The novel and unique structure of the present touch control structure ensures the adjacent mesh blocks separated by the window region WR are connected to transmit touch signals.

Referring to FIG. 18A and FIG. 18C, the first conductive plate CP1, the second conductive plate CP2, and the first conductive bridge CB1 are respectively around a first portion P1, a second portion P2, and a third portion P3 of a periphery of the window region WR. Optionally, the third portion P3 is partially overlapping with the first portion P1, and partially overlapping with the second portion P2. Optionally, the first portion P1 is on the first side S1 of the window region WR; the second portion P2 is on the second side S2 of the window region WR; and the third portion P3 is on the fourth side S4 of the window region WR.

Referring to FIG. 18A to FIG. 18C, in some embodiments, the window-crossing column Cwc of the plurality of second mesh electrodes TE2 includes a third mesh block MB3 and a fourth mesh block MB4 respectively on a third side S3 and a fourth side S4 of the window region WR; a third conductive plate CP3 directly connected to multiple mesh lines of the third mesh block MB3; a fourth conductive plate CP4 directly connected to multiple mesh lines of the fourth mesh block MB4; and a second conductive bridge CB2 connecting the third conductive plate CP3 and the fourth conductive plate CP4.

Referring to FIG. 18A and FIG. 18C, the third conductive plate CP3, the fourth conductive plate CP4, and the second conductive bridge CB2 are respectively around a fourth portion P4, a fifth portion P5, and a sixth portion P6 of the periphery of the window region WR. In one example, the third conductive plate CP3, the fourth conductive plate CP4, and the second conductive bridge CB2 are parts of a unitary structure; the third conductive plate CP3 include a plate of a first arch shape, the fourth conductive plate CP4 include a plate of a second arch shape, and the second conductive bridge CB2 include a bridge of a third arch shape. In another example, the third arch shape is non-concentric with respect to the first arch shape, and is non-concentric with respect to the second arch shape, thus the boundary between the third conductive plate CP3 and the second conductive bridge CB2 and boundary between the fourth conductive plate CP4 and the second conductive bridge CB2 can be discerned. In another example, the third arch shape has a radius different from that of the first arch shape, and different from that of the second arch shape, thus the boundary between the third conductive plate CP3 and the second conductive bridge CB2 and boundary between the fourth conductive plate CP4 and the second conductive bridge CB2 can be discerned. Optionally, the sixth portion P6 is partially overlapping with the fourth portion P4, and partially overlapping with the fifth portion P5. Optionally, the fourth portion P4 is on the third side S3 of the window region WR; the fifth portion P5 is on the fourth side S4 of the window region WR; and the sixth portion P6 is on the second side S2 of the window region WR.

Referring to FIG. 18A to FIG. 18C, in some embodiments, the window-crossing row Rwc of the plurality of first mesh electrodes TE1 further includes a third conductive bridge CB3 connecting the first conductive plate CP1 and the second conductive plate CP2. Referring to FIG. 18A and FIG. 18C, the first conductive plate CP1, the second conductive plate CP2, and the third conductive bridge CB3 are respectively around a first portion P1, a second portion P2, and a seventh portion P7 of a periphery of the window region WR. Optionally, the seventh portion P7 is partially overlapping with the first portion P1, and partially overlapping with the second portion P2. Optionally, the first portion P1 is on the first side S1 of the window region WR; the second portion P2 is on the second side S2 of the window region WR; and the seventh portion P7 is on the third side S3 of the window region WR.

Referring to FIG. 18A to FIG. 18C, in some embodiments, the window-crossing column Cwc of the plurality of second mesh electrodes TE2 further includes a fourth conductive bridge CB4 connecting the third conductive plate CP3 and the fourth conductive plate CP4. Referring to FIG. 18A and FIG. 18C, the third conductive plate CP3, the fourth conductive plate CP4, and the fourth conductive bridge CB4 are respectively around a fourth portion P4, a fifth portion P5, and an eighth portion P8 of the periphery of the window region WR. Optionally, the eighth portion P8 is partially overlapping with the fourth portion P4, and partially overlapping with the fifth portion P5. Optionally, the fourth portion P4 is on the third side S3 of the window region WR; the fifth portion P5 is on the fourth side S4 of the window region WR; and the eighth portion P8 is on the first side S1 of the window region WR.

Referring to FIG. 17, in some embodiments, the window-crossing row Rwc further includes a plurality of first non-window mesh blocks NWB1, and the window-crossing column Cwc further includes a plurality of second non-window mesh blocks NWB2. Optionally, at least the first mesh block MB1 has an area smaller than (by 5%, by 10%, by 20%, by 30%, by 40%, by 50%, by 60%, by 70%, by 80%, by 90%, or by 95% or more) each of the plurality of first non-window mesh blocks NWB1 due to presence of the window region WR. Optionally, the first mesh block MB1 has an area smaller than each of the plurality of first non-window mesh blocks NWB1, and the second mesh block MB2 also has an area smaller than each of the plurality of first non-window mesh blocks NWB1. Optionally, at least the third mesh block MB3 has an area smaller than each of the plurality of second non-window mesh blocks NWB2 due to presence of the window region WR. Optionally, the third mesh block MB3 has an area smaller than each of the plurality of second non-window mesh blocks NWB2, and the fourth mesh block MB4 also has an area smaller than each of the plurality of second non-window mesh blocks NWB2.

Figure 19:
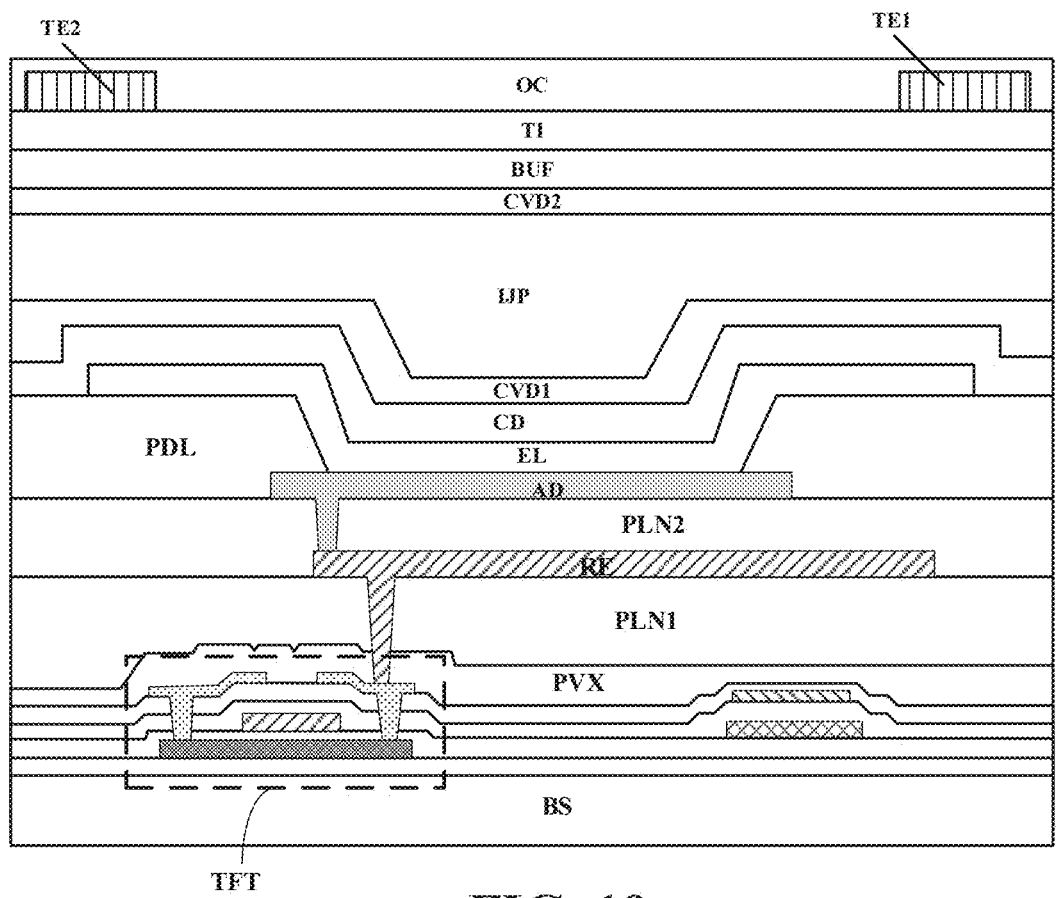
FIG. 19 is a cross sectional view of a display panel in some embodiments according to the present disclosure.

In another aspect, the present disclosure provides a display apparatus. In some embodiments, the display apparatus includes a display panel; a touch control structure described herein or fabricated by a method described herein; and an integrated circuit. Examples of appropriate display apparatuses include, but are not limited to, an electronic paper, a mobile phone, a tablet computer, a television, a monitor, a notebook computer, a digital album, a GPS, etc. Optionally, the display apparatus is an organic light emitting diode display apparatus. Optionally, the display apparatus is a liquid crystal display apparatus, FIG. 19 is a cross sectional view of a display panel in some embodiments according to the present disclosure. Referring to FIG. 19, in the display region, the display panel includes a base substrate BS, a plurality of thin film transistors TFT on the base substrate BS, a passivation layer PVX on a side of the plurality of thin film transistors TFT away from the base substrate BS, a first planarization layer PLN1 on side of the passivation layer PVX away from the base substrate BS, a relay electrode RE on side of the first planarization layer PLN1 away from the passivation layer PVX, a second planarization layer PLN2 on a side of the relay electrode RE away from the first planarization layer PLN1, a pixel definition layer PDL on a side of the second planarization layer PLN2 away from the first planarization layer PLN1 and defining subpixel apertures, an anode AD on a side of the second planarization layer PLN2 away from the first planarization layer PLN1, a light emitting layer EL on a side of the anode AD away from the second planarization layer PLN2, a cathode CD on a side of the light emitting layer EL away from the anode AD, a first inorganic encapsulating layer CVD1 on a side of the cathode CD away from light emitting layer EL, an organic encapsulating layer IJP on a side of the first inorganic encapsulating layer CVD1 away from the cathode CD, a second inorganic encapsulating layer CVD2 on a side of the organic encapsulating layer IJP away from the first inorganic encapsulating layer CVD1, a buffer layer BUF on a side of the second inorganic encapsulating layer CVD2 away from the organic encapsulating layer IJP, a touch insulating layer T1 on a side of the buffer layer BUF away from the second inorganic encapsulating layer CVD2, touch electrodes (e.g., the plurality of first touch electrodes TE1 and the plurality of second touch electrodes TE2 as shown in FIG. 19) on a side of the touch insulating layer T1 away from the buffer layer BUF, and an overcoat layer OC on a side of the touch electrodes away from the touch insulating layer T1.

Figure 20:
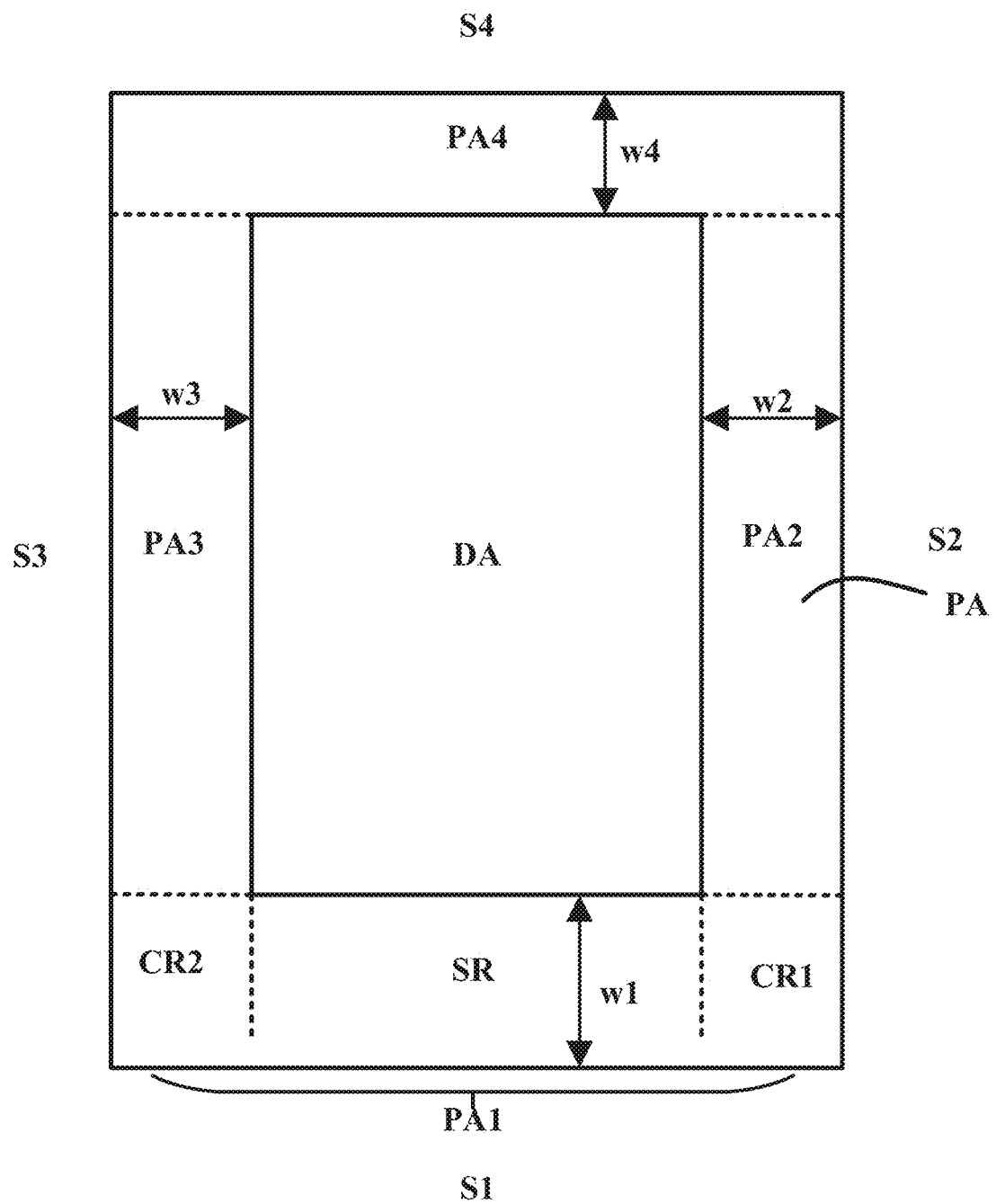
FIG. 20 is a schematic diagram illustrating a display area and a peripheral area in a display apparatus in some embodiments according to the present disclosure.

FIG. 20 is a schematic diagram illustrating a display area and a peripheral area in a display apparatus in some embodiments according to the present disclosure. Referring to FIG. 20, in some embodiments, the display apparatus includes a display area DA and a peripheral area PA. Optionally, the display area DA is substantially the same as the touch control area TCA in FIG. 1B, and the peripheral area PA is substantially the same as the peripheral area PA in FIG. 1B. In some embodiments, the peripheral area PA includes a first sub-area PA1 on a first side S1 of the display area DA, a second sub-area PA2 on a second side S2 of the display area DA, a third sub-area PA3 on a third side S3 of the display area DA, a fourth sub-area PA4 on a fourth side S4 of the display area DA. Optionally, the first side S1 and the fourth side S4 are opposite to each other. Optionally, the second side S2 and the third side S3 are opposite to each other. Optionally, the first sub-area PA1 is a sub-area where the plurality of first touch signal lines SGL1, the plurality of second touch signal lines SGL2, and the plurality of third touch signal lines SGL3 are connected to an integrated circuit (e.g., an integrated touch control circuit).

In some embodiments, the first sub-area PA1 includes a side region SR and one or more corner regions (e.g., a first corner region CR1 and a second corner region CR2). The one or more corner regions are respectively at a corner of the touch control structure. The one or more corner regions respectively connect the side region SR to one or more adjacent sub-areas of the peripheral area PA. For example, the first corner region CR1 connects the side region SR to the second sub-area PA2, and the second corner region CR2 connects the side region SR to the third sub-area PA3.

In some embodiments, the first sub-area PA1 has a first shortest width w1 along a direction from the display area DA to the first sub-area PA1. Optionally, the second sub-area PA2 has a second shortest width w2 along a direction from the display area DA to the second sub-area PA2. Optionally, the third sub-area PA3 has a third shortest width w3 along a direction from the display area DA to the third sub-area PA3. Optionally, the fourth sub-area PA4 has a fourth shortest width w4 along a direction from the display area DA to the fourth sub-area PA4. In some embodiments, the first shortest width w1 is greater than at least one of the other shortest widths, e.g., greater than at least one of the second shortest width w2, the third shortest width w3, or the fourth shortest width w4. Optionally, the first shortest width w1 is greater than any one of the other shortest widths, e.g., greater than the second shortest width w2, greater than the third shortest width w3, and greater than the fourth shortest width w4.

For example, the first sub-area PA1 of the peripheral area having the double-layer region and the single-layer region discussed above has a first shortest width w1 along a direction from the touch control area to the first sub-area PA1. The first shortest width w1 can be reduced from 1.36 mm to 1.076 mm. The reference value 1.36 mm may be a reference first shortest width of a corresponding first sub-area of the peripheral area in a reference display apparatus that does not have the double-layer region and the single-layer region of the present disclosure. In one example, touch signal lines of the reference display apparatus adopt a double-layer structure throughout the peripheral area. By forming the touch signal lines to have an intricate structure as discussed in the present disclosure, the first shortest width in the first sub-area can be significantly reduced as compared to that in the reference display apparatus.

As used herein, the term "display area" refers to an area of a display substrate (e.g., an opposing substrate or an array substrate) in a display panel where image is actually displayed. Optionally, the display area may include both a subpixel region and an inter-subpixel region. A subpixel region refers to a light emission region of a subpixel, such as a region corresponding to a pixel electrode in a liquid crystal display or a region corresponding to a light emissive layer in an organic light emitting diode display panel. An inter-subpixel region refers to a region between adjacent subpixel regions, such as a region corresponding to a black matrix in a liquid crystal display or a region corresponding a pixel definition layer in an organic light emitting diode display panel. Optionally, the inter-subpixel region is a region between adjacent subpixel regions in a same pixel. Optionally, the inter-subpixel region is a region between two adjacent subpixel regions from two adjacent pixels.

In another aspect, the present disclosure provides a method of fabricating a touch control structure. In some embodiments, the method includes forming a plurality of touch electrodes in a touch control area and forming a plurality of touch signal lines in a peripheral area. Optionally, forming a respective one of the plurality of touch signal lines includes forming a double-layer structure in a double-layer region and forming a single-layer structure in a single-layer region. Optionally, the double-layer region and the single-layer region are in a first sub-area of the peripheral area where the plurality of touch signal lines connect to an integrated circuit, the first sub-area has a first shortest width along a direction from the touch control area to the first sub-area, the first shortest width is greater than a shortest width of at least one of sub-areas of the peripheral area other than the first sub-area. Optionally, a plurality of adjacent double-layer structures in the double-layer region are formed to be respectively connected to a plurality of adjacent single-layer structures in the single-layer region. Optionally, at least two of the plurality of adjacent single-layer structures are formed to be respectively in a first layer and a second layer. Optionally, the method further includes forming a touch insulating layer between the first layer and the second layer.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention". "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or compere s explicitly recited in the following claims.

What is claimed is:

1. A touch control structure, comprising a plurality of touch electrodes in a touch control area and a plurality of touch signal lines in a peripheral area;
    wherein a respective one of the plurality of touch signal lines comprises a double-layer structure in a double-layer region and a single-layer structure in a single-layer region, wherein the double-layer region and the single-layer region are in a first sub-area of the peripheral area where the plurality of touch signal lines connect to an integrated circuit, the first sub-area has a first shortest width along a direction from the touch control area to the first sub-area, the first shortest width is greater than a shortest width of at least one of sub-areas of the peripheral area other than the first sub-area;
    a plurality of adjacent double-layer structures in the double-layer region are respectively connected to a plurality of adjacent single-layer structures in the single-layer region;
    at least two of the plurality of adjacent single-layer structures are respectively in a first layer and a second layer; and
    the touch control structure further comprises a touch insulating layer between the first layer and the second layer;
    wherein the respective one of the plurality of touch signal lines has a line width in a range of 2.5 μm to 4.5 μm;
    orthographic projections of adjacent single-layer structures on a base substrate are spaced apart by a shortest distance in a range of 1.1 μm to 3.1 μm;
    orthographic projections of adjacent single-layer structures in the first layer on the base substrate are spaced apart by a shortest distance in a range of 4.7 μm to 10.7 μm; and
    orthographic projections of adjacent single-layer structures in the second layer on the base substrate are spaced apart by a shortest distance in a range of 4.7 μm to 10.7 μm.

2. The touch control structure of claim 1, wherein the first shortest width is greater than a shortest width of any one of sub-areas of the peripheral area other than the first sub-area.

3. The touch control structure of claim 1, wherein a respective double-layer structure comprises a first portion in the first layer and a second portion in the second layer;
    a first adjacent respective single-layer structure in the second layer is connected to a respective second portion of a first adjacent double-layer structure; and
    a second adjacent respective single-layer structure in the first layer is connected to a respective first portion of a second adjacent double-layer structure.

4. The touch control structure of claim 3, wherein the first portion and the second portion are connected through a connecting via extending through the touch insulating layer.

5. The touch control structure of claim 1, wherein multiple first double-layer structures respectively of multiple touch signal lines of the plurality of touch signal lines are clustered in a first region;
    multiple first single-layer structures respectively of the multiple touch signal lines of the plurality of touch signal lines are clustered in a second region;
    the multiple first double-layer structures are substantially parallel to each other, and respectively extend along a first direction;
    the multiple first single-layer structures are substantially parallel to each other, and respectively extend along a second direction;
    at least two of the multiple first single-layer structures are respectively in the first layer and the second layer; and
    the first direction and the second direction are different from each other, and intersecting each other at an angle greater than zero.

6. The touch control structure of claim 5, wherein multiple connecting points respectively connecting the multiple first double-layer structures and the multiple first single-layer structures are arranged along a seventh direction; and
    the second direction and the seventh direction intersect each other at an angle in a range of 6 degrees to 15 degrees.

7. The touch control structure of claim 1, wherein multiple first single-layer structures respectively of multiple touch signal lines of the plurality of touch signal lines are clustered in a second region;
    multiple second single-layer structures respectively of the multiple touch signal lines of the plurality of touch signal lines are clustered in a third region;
    the multiple second single-layer structures are respectively connected to the multiple first single-layer structures;
    the multiple first single-layer structures are substantially parallel to each other, and respectively extend along a second direction;
    the multiple second single-layer structures are substantially parallel to each other, and respectively extend along a third direction;
    at least two of the multiple second single-layer structures are respectively in the first layer and the second layer; and
    the second direction and the third direction are different from each other, and intersecting each other at an angle greater than zero.

8. The touch control structure of claim 7, wherein the second direction and the third direction intersect each other at an angle in a range of 15 degrees to 25 degrees.

9. The touch control structure of claim 7, wherein multiple connecting points respectively connecting the multiple first single-layer structures and the multiple second single-layer structures are arranged along a fourth direction; and
the second direction and the fourth direction intersect each other at an angle in a range of 20 degrees to 40 degrees.

10. The touch control structure of claim 1, wherein multiple second single-layer structures respectively of multiple touch signal lines of the plurality of touch signal lines are clustered in a third region;
multiple second double-layer structures respectively of the multiple touch signal lines of the plurality of touch signal lines are clustered in a fourth region;
the multiple second single-layer structures are substantially parallel to each other, and respectively extend along a third direction;
the multiple second double-layer structures are substantially parallel to each other, and respectively extend along a fifth direction;
at least two of the multiple second single-layer structures are respectively in the first layer and the second layer;
the multiple second single-layer structures are respectively connected to the multiple second double-layer structures; and
multiple second connecting points respectively connecting the multiple second single-layer structures and the multiple second double-layer structures are arranged along a sixth direction.

11. The touch control structure of claim 10, wherein the touch control structure comprises a via extending through the touch insulating layer at a respective second connecting point, a material in the second layer connected to a material in the first layer through the via.

12. The touch control structure of claim 1, wherein multiple third double-layer structures respectively of multiple touch signal lines of the plurality of touch signal lines are clustered in a fifth region;
multiple fourth double-layer structures respectively of the multiple touch signal lines of the plurality of touch signal lines are clustered in a sixth region;
multiple third single-layer structures respectively of the multiple touch signal lines of the plurality of touch signal lines are clustered in a seventh region;
a respective one of the multiple third single-layer structures is a half loop structure connecting a respective one of the multiple third double-layer structures and a respective one of the multiple fourth double-layer structures;
the half loop structure comprises two parallel portions respectively extending along a second direction and a connecting portion connecting the two parallel portions together;
at least two of the multiple third single-layer structures are respectively in the first layer and the second layer;
the multiple third double-layer structures are substantially parallel to each other, and respectively extend along a first direction;
the multiple fourth double-layer structures are substantially parallel to each other, and respectively extend along the first direction; and
the first direction and the second direction are different from each other, and intersecting each other at an angle greater than zero.

13. The touch control structure of claim 12, wherein multiple fourth single-layer structures respectively of the multiple touch signal lines of the plurality of touch signal lines are clustered in an eighth region;
the multiple fourth single-layer structures are respectively connected to the multiple third double-layer structures;
the multiple fourth single-layer structures are substantially parallel to each other, and respectively extend along the second direction; and
the multiple fourth single-layer structures are at least a sub-set of multiple first single-layer structures.

14. The touch control structure of claim 1, wherein the touch control structure is limited in a touch control region and absent in a window region at least partially surrounded by the touch control region;
wherein a window-crossing row of a plurality of first mesh electrodes comprises:
a first mesh block and a second mesh block respectively on a first side and a second side of the window region;
a first conductive plate directly connected to multiple mesh lines of the first mesh block;
a second conductive plate directly connected to multiple mesh lines of the second mesh block; and
a first conductive bridge connecting the first conductive plate and the second conductive plate;
wherein the first conductive plate, the second conductive plate, and the first conductive bridge are respectively around a first portion, a second portion, and a third portion of a periphery of the window region;
the first conductive plate and the second conductive plate are in the second layer; and
the first conductive bridge is in the first layer.

15. The touch control structure of claim 1, wherein at least two adjacent single-layer structures respectively in the first layer and the second layer are electrically connected to adjacent rows of touch electrodes.

16. A display apparatus, comprising:
a display panel;
the touch control structure of claim 1; and
an integrated circuit.

17. The display apparatus of claim 16, wherein the display panel comprises:
a plurality of light emitting elements;
an encapsulating layer on the plurality of light emitting elements, wherein the encapsulating layer comprising a first inorganic encapsulating layer, an organic encapsulating layer on a side of the first inorganic encapsulating layer away from the plurality of light emitting elements, a second inorganic encapsulating layer on a side of the organic encapsulating layer away from the first inorganic encapsulating layer; and
a buffer layer on a side of the second inorganic encapsulating layer away from the organic encapsulating layer;
wherein the touch insulating layer is on a side of the buffer layer away from the second inorganic encapsulating layer.

* * * * *